United States Patent
Kuroda et al.

(10) Patent No.: US 6,915,434 B1
(45) Date of Patent: Jul. 5, 2005

(54) ELECTRONIC DATA STORAGE APPARATUS WITH KEY MANAGEMENT FUNCTION AND ELECTRONIC DATA STORAGE METHOD

(75) Inventors: Yasutsugu Kuroda, Kanagawa (JP); Jun Kamada, Kanagawa (JP); Shoko Iwase, Sunnyvale, CA (US); Bintatsu Noda, Kanagawa (JP); Etsuo Ono, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/327,477

(22) Filed: Jun. 8, 1999

(30) Foreign Application Priority Data

Dec. 18, 1998 (JP) ............................................ 10-360345

(51) Int. Cl.⁷ ............................ H04L 9/32; G06F 12/14; G06F 11/30
(52) U.S. Cl. ........................ 713/193; 713/163; 380/44; 380/278; 380/280
(58) Field of Search ................................ 713/193, 163, 713/155; 380/277–282, 44

(56) References Cited

U.S. PATENT DOCUMENTS

| | | | |
|---|---|---|---|
| 5,144,665 A | * 9/1992 | Takaragi et al. ............... | 380/30 |
| 5,502,766 A | * 3/1996 | Boebert et al. .............. | 713/193 |
| 5,748,736 A | * 5/1998 | Mittra ........................ | 713/163 |
| 5,784,464 A | * 7/1998 | Akiyama et al. ............ | 713/155 |
| 5,784,736 A | * 7/1998 | Issler et al. ................ | 12/142 B |
| 5,915,025 A | * 6/1999 | Taguchi et al. ............... | 380/44 |
| 6,295,361 B1 | * 9/2001 | Kadansky et al. ........... | 380/278 |
| 6,421,779 B1 | * 7/2002 | Kuroda et al. .............. | 713/169 |

FOREIGN PATENT DOCUMENTS

EP      0 715 241      6/1996

OTHER PUBLICATIONS

European Office Action Application NO. 99 304 647.3–1525 dated Feb. 20, 2004.
Adamouski F J: 'Encryption technology other than PKI' Security Technology, 1998. Proceedings., 32nd Annual 1998 International Carnahan Conference on Alexandria, VA, USA Oct. 12–14, 1998, New York, NY, USA,IEEE, US, Oct. 12, 1998, pp. 108–116, XP010309584 ISBN: 0–7803–4535–5.
Mittra S: 'IOLUS: A Framework For Scalable Secure Multicasting' Computer Communications Review, Association For Computing Machinery. New York, US, vol. 27, No. 4, Sep. 14, 1997, pp. 1–12, XP002931671 ISSN: 0146–4833.
Menezes, Oorschot, Vanstone: 'Handbook of applied cryptography' Handbook of Applied Cryptography, CRC Press Series on Discrete Mathematics and Its Applications, CRC Press, 1997, pp. 570–572, XP002249713 Boca Raton, FL, US ISBN: 0–8493–8523–7.
EP–A–0 715 241 (Mitsubishi Corp) Jun. 5, 1996.

(Continued)

*Primary Examiner*—Gilberto Barrón, Jr.
*Assistant Examiner*—A. Nobahar
(74) *Attorney, Agent, or Firm*—Staas & Halsey LLP

(57) ABSTRACT

A storage apparatus includes a key management unit for managing an individual key unique to the apparatus and a common key shared with other storage apparatuses, and an encryption unit for performing an encrypting process or verifying data for performing the encrypting process on electronic data stored in the apparatus to which the unit belongs using the individual key, and performing the encrypting process or verifying the data on the electronic data transmitted to or received from another apparatus using the common key. Thus, the apparatus communicates data using an applicable common key in a local environment and a global environment, appropriately manages a key in each environment, and guarantees the security of the electronic data.

23 Claims, 25 Drawing Sheets

ELECTRONIC DATA STORAGE APPARATUS WITH KEY MANAGEMENT FUNCTION

OTHER PUBLICATIONS

Adamouski, F. J., "Encryption Technoolgy Other Than PKI", Security Technology, 1998, Proceedings., 32$^{nd}$ Annual 1998 Int'l Carnahan Conference on Alexandria, VA, Oct. 12–14, 1998, New York, NY, IEEE, pp. 108–116.

Mittra S., "IOLUS: A Framework For Scalable Secure Multicasting", Computer Communications Review, Association for Computing Machinery, New York, vol. 27, No. 4, Sep. 14, 1997, pp. 1–12.

Menezes, Oorschot, Vanstone, "Handbook of Applied Cryptography", CRC Press Series on Discrete Mathematics and its Applications, 1997, pp. 568, 570–572.

Menezes, Oorschot, Vanstone: "Handbook of Applied Cryptography" Handbook of Applied Cryptography, CRC Press Series on Discrete Mathematics and Its Application, CRC Press, 1997, pp. 4–5, 551–553. XP000864279. Boca Raton, FL US ISBN: 0–8493–8523–7.

European Office Action dated Aug. 16, 2004.

Menezes, Oorschot, Vanstone: "Handbook of Applied Cryptography" Handbook of Applied Cryptography, CRC Press Series on Discrete Mathematics and Its Application, CRC Press, 1997, pp. 4–5, 551–553. XP000864279. Boca Raton, FL US ISBN: 0–8493–8593–7.

\* cited by examiner

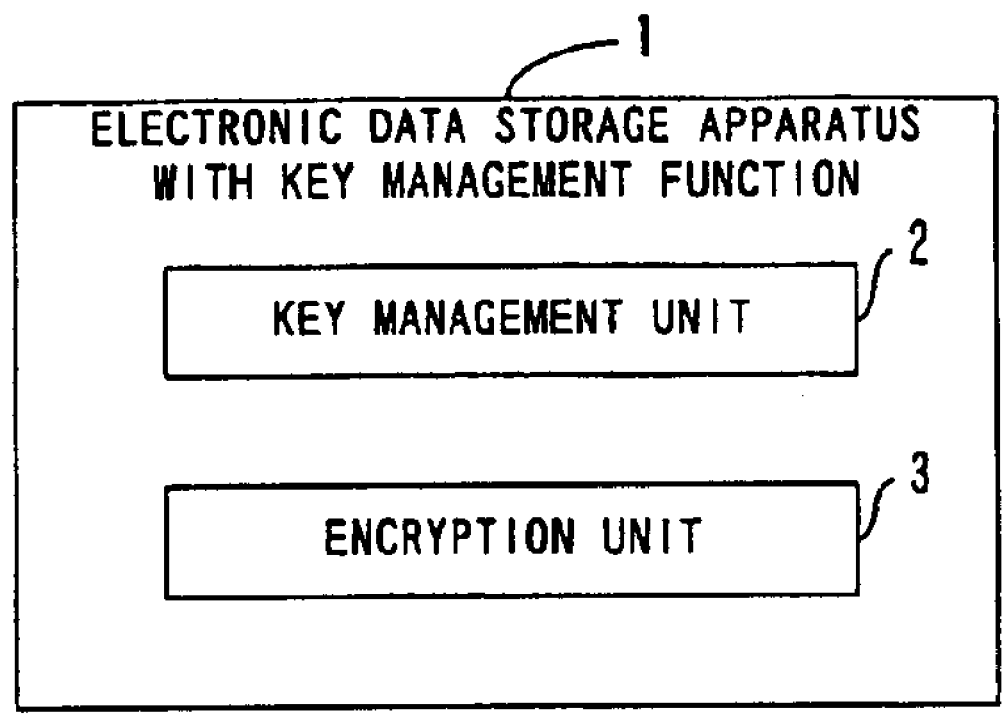
F I G. 1

ELECTRONIC DATA STORAGE APPARATUS WITH KEY MANAGEMENT FUNCTION AND ELECTRONIC DATA STORAGE METHOD

BACKGROUND OF THE INVENTION

Field of the Invention

The present invention relates to the security of electronic documents, and more specifically to an electronic data storage apparatus with a key management function and an electronic data storage method for guaranteeing the security of electronic data by changing the key used in a process of encrypting electronic data in document form in a local environment and a global environment.

With an increasing number of electronic transactions and of computers used in official fields, etc., important documents such as contracts, domicile certificates, etc. have come to be processed as electronic data through networks.

In common contracts and renewal procedures, the originals of documents (contracts, applications, receipts, etc.) and their copies (domicile certificates and their extracts, etc.) are often required. The originals and the copies can be clearly distinguished between them if they are printed on paper because the physical features of paper and ink are different between the originals and the copies. On the similar ground, the originals could not be easily amended.

However, electronic documents are easily copied to have two same electronic documents, thereby causing the problem that the user cannot tell which is the original document. Therefore, there arises the case where an important document once represented by electronic data is printed onto paper for storage and transfer by mail.

When an important document is stored or transferred as an electronic document according to the conventional method, a common algorithm is used in an electronic data storage apparatus to guarantee the security by performing an encrypting process on the electronic data forming the document. There are two types of keys for use in the algorithm. One is a common encryption using a common key between a transmitter and a receiver of electronic data. The other is a public key encryption using a public key and a private key.

Thus, in the conventional technology, the security of an electronic document is guaranteed by using different keys in an encrypting process between the local environment for electronic data storage devices for storing the same type of electronic data and the global environment for a number of general electronic data storage devices for storing different types of electronic data. However, since a common algorithm is used in the electronic data storage device, the common key is accidentally used in the electronic data storage device in the global environment, and the public key can be used in the local environment.

As a result, there has been the problem that an authentication station required to manage the public key is operated even on an electronic data storage device to be used only in the local environment, or the reliability on all important documents is lost by the common key disclosed to the electronic data storage devices in the global environment.

SUMMARY OF THE INVENTION

The present invention aims at providing an electronic data storage apparatus with a key management function capable of performing a key management process applicable to each environment by transmitting and receiving electronic data after performing an encrypting process on the electronic data using an individual key unique to an electronic data storage device when the device stores the electronic data, and after performing an encrypting process using a common key applicable to either a local environment or a global environment when electronic data is transmitted to or received from another electronic data storage device.

Another object of the present invention is to provide a method of storing electronic data with the security of the electronic data guaranteed by transmitting to or receiving from another electronic data storage device after re-encrypting using a common key the electronic data already encrypted using an individual key.

The electronic data storage apparatus according to the present invention includes a key management unit for managing an individual key unique to each electronic data storage apparatus, and a common key shared with other electronic data storage apparatuses; and an encryption unit for performing an encrypting process using the individual key on the electronic data stored in each electronic data storage apparatus, and performing an encrypting process using the common key or through data verification on the electronic data transmitted to or received from other electronic data storage apparatuses.

The key management unit manages a individual key unique to the electronic data storage apparatus to which it belongs, and a common key shared with other electronic data storage apparatuses.

The encryption unit performs an encrypting process using an individual key on the electronic data stored in the electronic data storage apparatus to which it belongs, and performs an encrypting process or data verification using a common key on the electronic data transmitted to and received from other electronic data storage apparatuses.

As described above, an encrypting process can be performed using an individual key unique to each electronic data storage apparatus on the electronic data to be stored in it, and an encrypting process and data verification can be performed using a common key shared with other electronic data storage apparatuses on the electronic data transmitted to and received from the apparatuses.

The common key managed by the key management unit can also be a group key shared in a group of a plurality of electronic data storage apparatuses.

At this time, a main electronic data storage apparatus exists in a group, and its own encryption unit generates an individual key of each of the electronic data storage apparatuses in the group using its own individual key. The generated individual key can be distributed to each electronic data storage apparatus, or a group key can be generated and distributed. Also, the group key can be generated and distributed by associating a key already assigned to the main electronic data storage apparatus with an externally specified new key.

Furthermore, there can be an electronic data storage and management apparatus for managing each of the main electronic data storage apparatuses of respective groups. The encryption unit of the apparatus can generate an individual key of each of the main electronic data storage apparatuses using its own individual key, and distribute the generated individual key to the main electronic data storage apparatuses.

In addition to the group key, the key management unit can also manage a public key as a communications key for use in transmitting data to and receiving data from an electronic data storage apparatus belonging to a group different from the electronic data storage apparatus to which it belongs.

In addition to the individual key and the common key, the key management unit can also manage a master key common in all electronic data storage apparatuses.

At this time, using the master key the encryption unit of each electronic data storage apparatus can generate an individual key by encrypting the information identifying the apparatus to which it belongs. When a main electronic data storage apparatus exists in a group, its encryption unit generates a group key by encrypting the information identifying the group using the individual key generated in the apparatus to which the encryption unit belongs, and the generated group key can be distributed to each of the electronic data storage apparatuses in the group.

Furthermore, a hierarchical structure in which a group of a plurality of electronic data storage apparatuses is defined as one hierarchical level is designed. In this structure, a key management unit can also manage a group key as a common key depending on the hierarchical level of the group of the electronic data storage apparatus to which the key management unit belongs. In a higher order group of electronic data storage apparatuses in the hierarchical structure, there can be an electronic data storage and management apparatus for managing the electronic data storage apparatuses in the group immediately below it. The electronic data storage and management apparatus can generate a group key corresponding to the hierarchical level immediately below it using its own individual key, and distribute the generated group key to the electronic data storage apparatuses in the group immediately below the group of the electronic data storage and management apparatus.

In the method of storing electronic data according to the present invention, the electronic data is communicated using a common key shared among electronic data storage apparatuses, and an encrypting process can be performed using the individual key unique to each electronic data storage apparatus on the data to be stored in its own apparatus.

In the method of storing electronic data according to the present invention, a group key can be stored as a common key to be shared in a group of a plurality of electronic data storage apparatuses. The electronic data encrypted in the transmitting electronic data storage apparatus using an individual key unique to the apparatus can be re-encrypted using a group key and transmitted to a receiving electronic data storage apparatus. The electronic data received by the receiving electronic data storage apparatus can be verified using the group key. If the electronic data is correct according to the verification, the electronic data can be re-encrypted and stored by the receiving apparatus using the individual key unique to the apparatus.

In addition, a public key is stored as a common key to be shared between a electronic data storage apparatus in a group and another electronic data storage apparatus in a different group. Between the above described apparatuses, the transmitting apparatus re-encrypts and transmits, using a public key, the electronic data encrypted using an individual key and stored in the apparatus, verifies the electronic data received by the receiving apparatus using a private key which is a pair to the public key. If the data is correct according to the verification, then the electronic data can be stored after being re-encrypted using the individual key unique to the receiving electronic data storage apparatus.

A computer-readable storage medium used in the electronic data storage apparatus according to the present invention can store a program having the function of verifying the electronic data stored in the electronic data storage apparatus using an individual key unique to the apparatus; and the function of transmitting the electronic data after re-encrypting it using a common key shared with a receiving apparatus if the data is correct according to the verification.

A computer-readable storage medium used in the electronic data storage apparatus according to the present invention can store a program having the function of verifying externally received electronic data using a common key shared with a transmitting apparatus; and the function of storing the electronic data after re-encrypting it using the individual key unique to the receiving apparatus if the data is correct according to the verification.

BRIEF DESCRIPTION OF THE DRAWINGS

The features and advantages of the present invention will be more clearly appreciated from the following description taken in conjunction with the accompanying drawings in which like elements are denoted by like reference numerals and in which:

FIG. 1 is a block diagram of the configuration showing the principle of the present invention;

DESCRIPTION OF THE PREFERRED EMBODIMENTS

FIG. 1 is a block diagram of the configuration showing the principle of the present invention. An electronic data storage apparatus 1 shown in FIG. 1 encrypts electronic data using an individual key unique to the apparatus, stores the data, and transmits and receives data using a common key applicable to a local environment or a global environment when an electronic data storage apparatus transmits or receives data between another electronic data storage apparatus.

In FIG. 1, a key management unit 2 manages an individual key unique to the electronic data storage apparatus to which the unit belongs and a common key shared between the apparatus and another electronic data storage apparatus.

An encryption unit 3 performs an encrypting process using an individual key on the electronic data stored in the apparatus to which the unit belongs, and performs an encrypting process or data verification using a common key on the electronic data transmitted to and received from another electronic data storage apparatus.

As described above, according to the present invention, an encrypting process is performed on the electronic data to be stored in each apparatus using an individual key unique to the apparatus, and performs an encrypting process and verification on the electronic data transmitted to or received from another electronic data storage apparatus using a common key shared between the two apparatuses.

Figure 2:
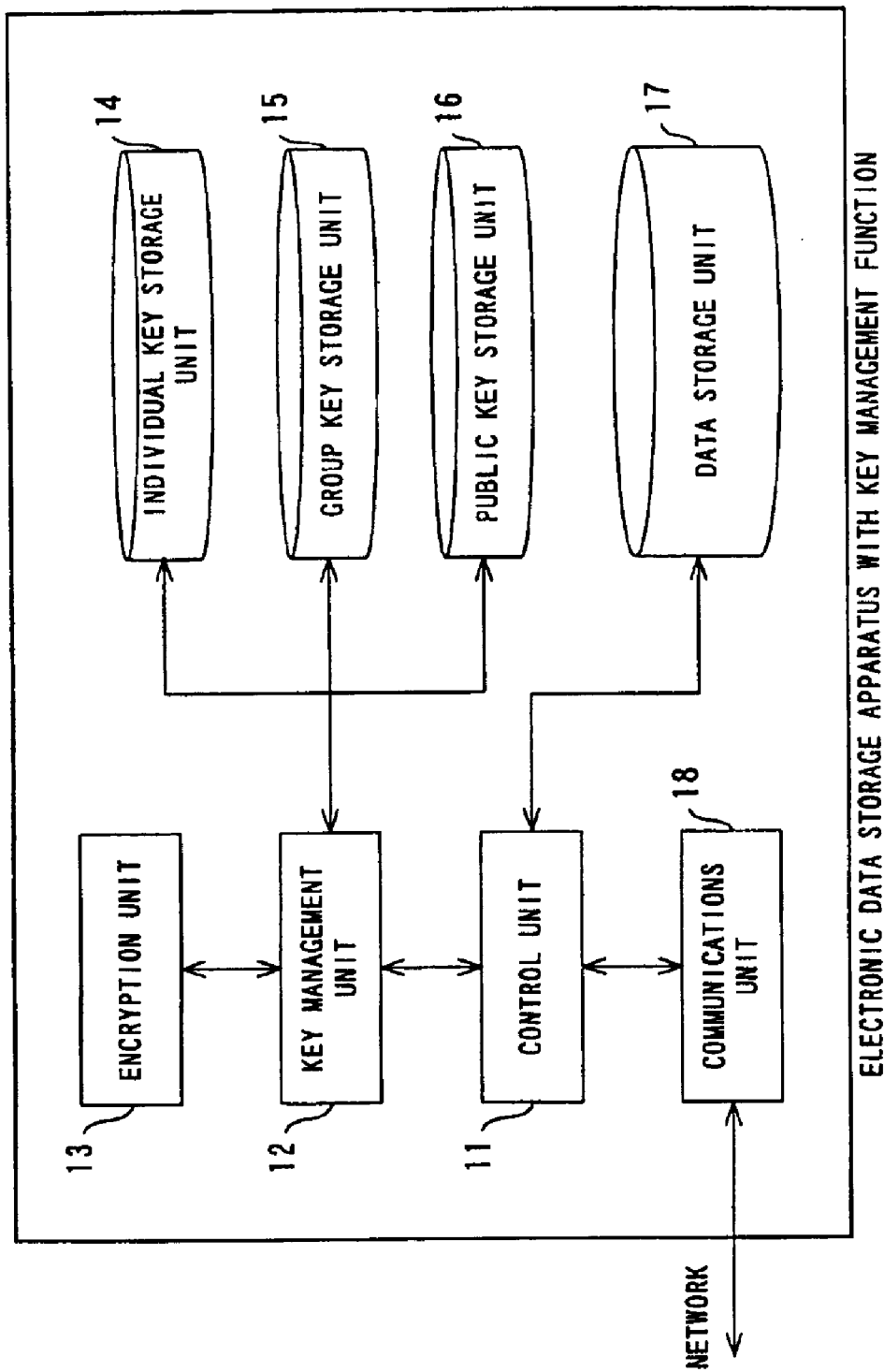
FIG. 2 is a block diagram of the configuration of the electronic data storage apparatus according to the first embodiment of the present invention.

FIG. 2 is a block diagram of the configuration of the electronic data storage apparatus with a key management function according to the first embodiment of the present invention. In the first embodiment of the present invention, an electronic data storage apparatus 10 stores three types of key, that is, an individual key, a group key, and a public key.

In FIG. 2, a control unit 11 controls the entire operation of the system. A key management unit 12 manages a key stored in the electronic data storage apparatus 10, and an encryption unit 13 generates a key, encrypts electronic data, and verifies the electronic data as necessary.

An individual key storage unit 14 stores an individual key unique to the electronic data storage apparatus 10 to which the unit belongs. A group key storage unit 15 stores a group key as a common key in a group of a plurality of electronic data storage apparatuses 10. A public key storage unit 16 stores a public key to be used when electronic data is transmitted to or received from an electronic data storage apparatus 10 belonging to another group.

The electronic data storage apparatus 10 further comprises a data storage unit 17 for storing electronic data, and a communications unit 18 for transmitting and receiving electronic data to and from another electronic data storage apparatus. The communications unit 18 is connected to a network.

Figure 3:
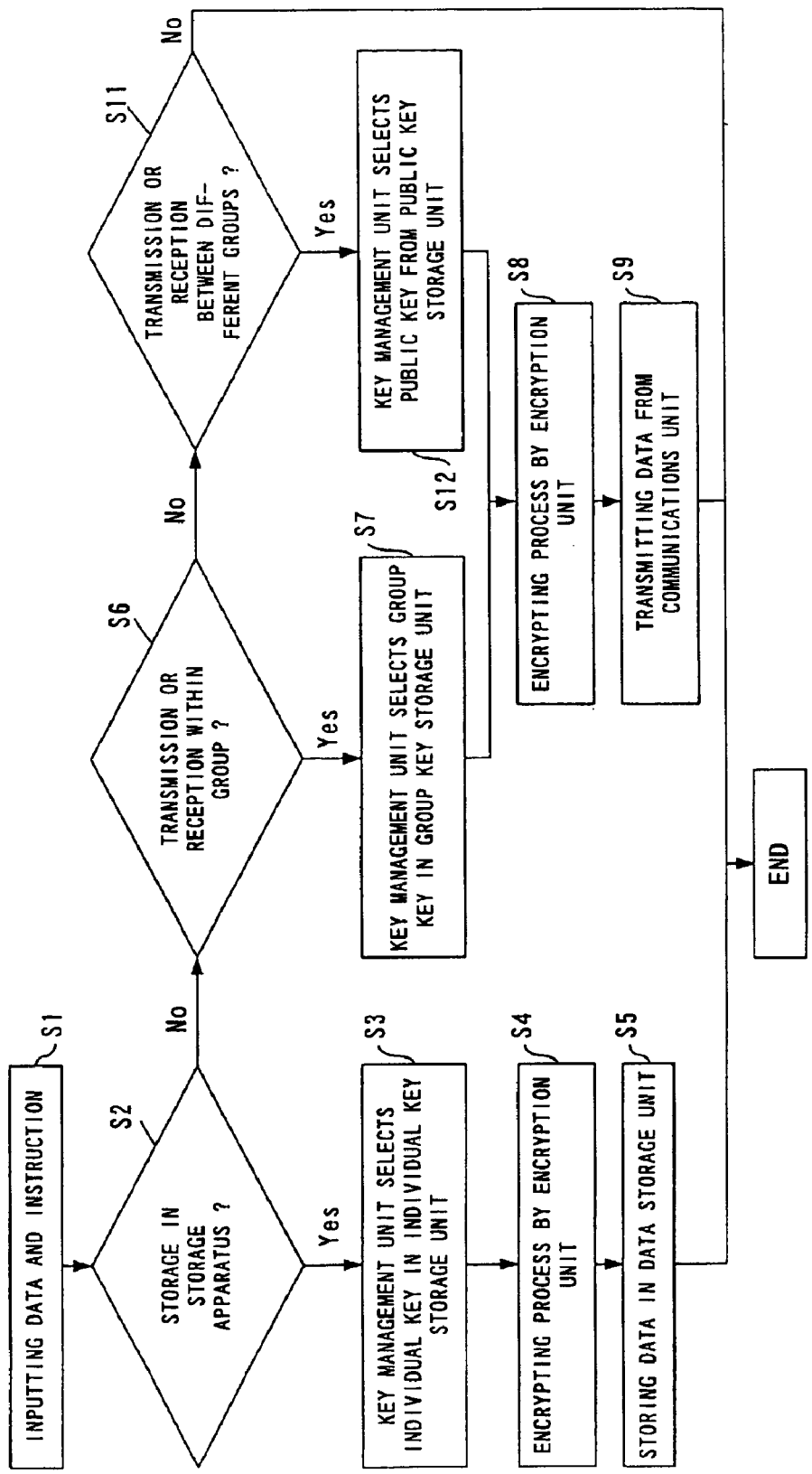
FIG. 3 is a flowchart of the entire process of the electronic data storage apparatus according to the first embodiment of the present invention.

FIG. 3 is a flowchart of the entire process of the electronic data storage apparatus according to the first embodiment of the present invention. In FIG. 3, when electronic data is input or, for example, an instruction to transmit electronic data is input in step S1, it is determined in step S2 whether or not the data is to be stored in the electronic data storage apparatus. The instruction to transmit data input in step S1 is provided from the user of the storage apparatus or an application through, for example, a network.

When data is to be stored, an individual key stored by the individual key storage unit 14 is selected by the key management unit 12 in step S3, and an encrypting process is performed on the electronic data by the encryption unit 13 using the individual key in step S4. In step S5, the data storage unit 17 stores the data, thereby terminating the process.

If data is not to be stored in step S2, it is determined in step S6 whether or not the instruction received in step S1 indicates the transmission and reception of data between electronic data storage apparatuses in the same group. If yes, the key management unit 12 selects a group key stored by the group key storage unit 15 in step S7, the encryption unit 13 performs an encrypting process using a group key in step S8, and the communications unit 18 transmits electronic data in step S9, thereby terminating the process.

If it is determined in step S6 that data is not transmitted or received in the same group, it is further determined in step S11 whether or not data is to be transmitted or received between electronic data storage apparatuses belonging to different groups. If not, the process terminates without proceeding with the process. If yes, the key management unit 12 selects a public key from the public key storage unit 16 in step S12, an encrypting process is performed using a public key in step S8, data is transmitted in step S9, thereby terminating the process.

Figure 4:
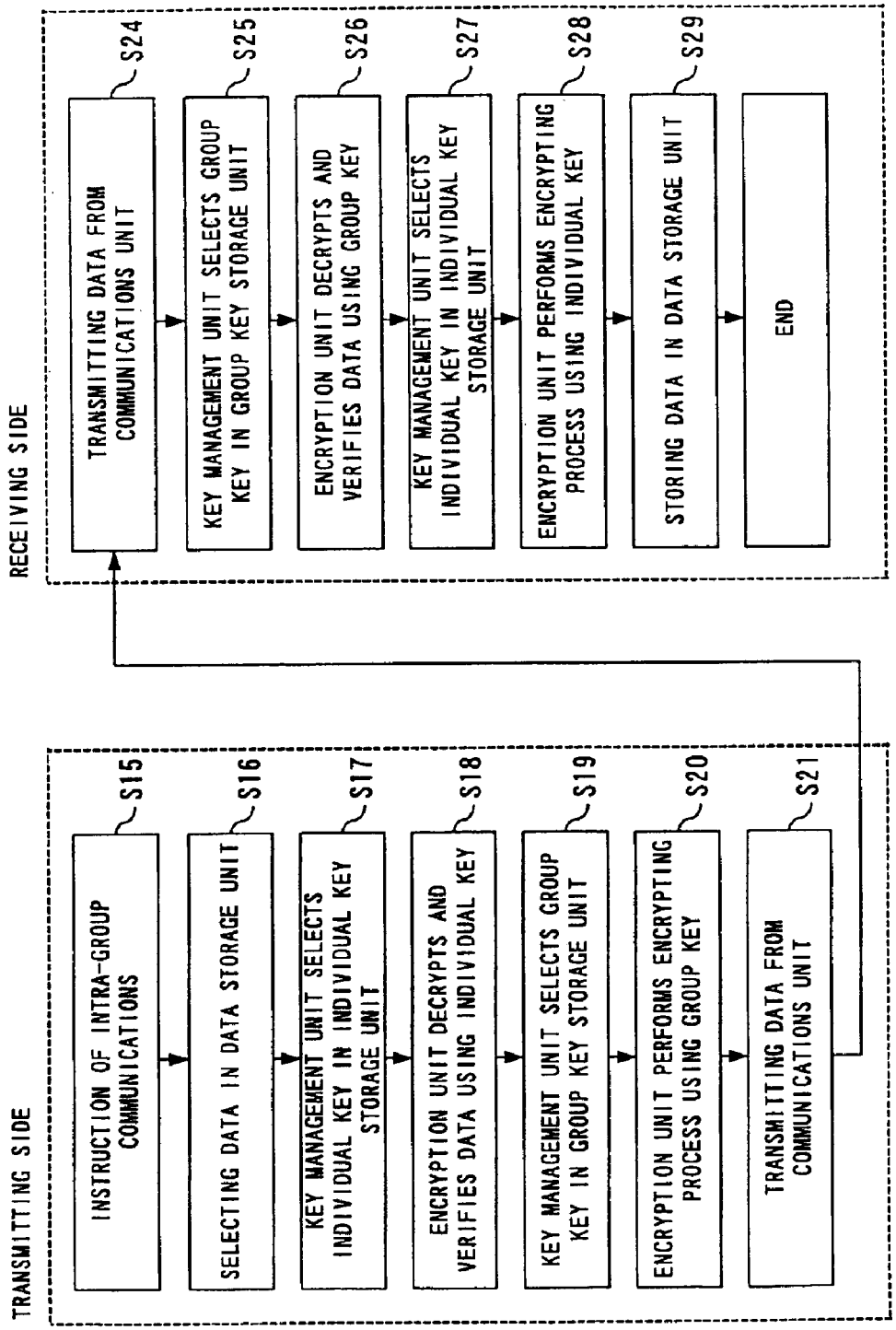
FIG. 4 is a flowchart of the process of transmitting and receiving data between electronic data storage apparatuses belonging to the same group.

FIG. 4 is a flowchart showing the details of the intra-group data transmission and reception process shown in FIG. 3. In FIG. 4, when an intra-group communications instruction is provided for the transmitting electronic data storage apparatus in step S15, data to be transmitted from the data storage unit 17 is selected in step S16, the key management unit 12 selects an individual key stored by the individual key storage unit 14 in step S17, and the encryption unit 13 decrypts the electronic data and verifies the contents of the data using the individual key in step S18. The process performed by the encryption unit 13 is described later in detail.

If it is determined as a result of the verification of the electronic data that the electronic data has not been amended, then the key management unit 12 selects a group key stored in the group key storage unit 15 in step S19, the encryption unit 13 encrypts the electronic data using the group key in step S20, and the communications unit 18 transmits the data to the receiving electronic data storage apparatus in step S21.

In the receiving electronic data storage apparatus, the communications unit 18 receives data in step S24, the key management unit 12 selects a group key stored by the group key storage unit 15 in step S25, and the encryption unit 13 decrypts the electronic data and verifies the contents of the data using the group key in step S26.

If it is determined as a result of the verification that the electronic data has not been amended, then the key management unit 12 selects an individual key stored by the individual key storage unit 14 in step S27, the encryption unit 13 encrypts the electronic data using the individual key in step S28, and the data storage unit 17 stores the data in step S29, thereby terminating the process.

Figure 5:
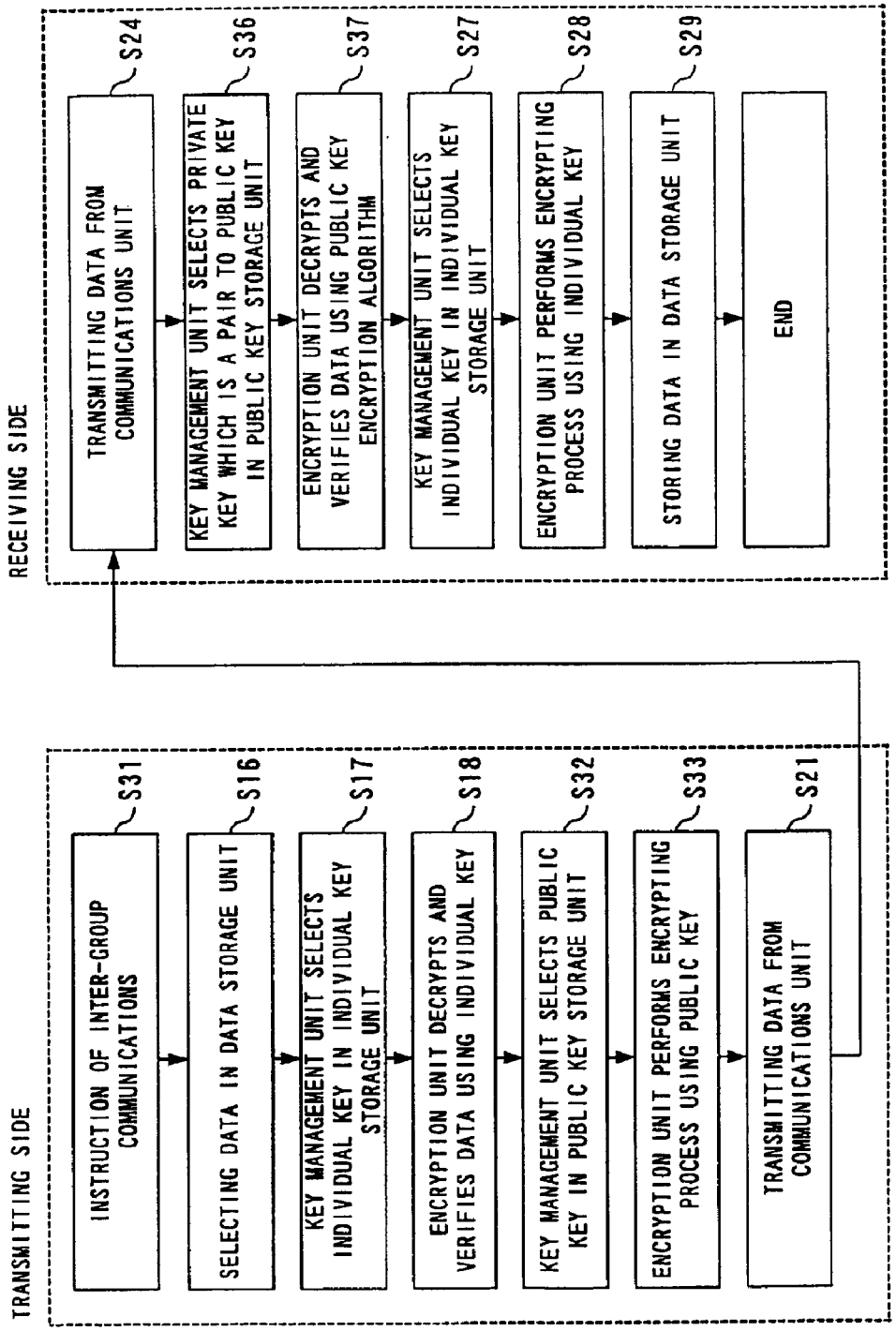
FIG. 5 is a flowchart of the process of transmitting and receiving data between electronic data storage apparatuses belonging to different groups.

FIG. 5 is a flowchart of the process of transmitting and receiving data between electronic data storage apparatuses belonging to different groups. Described below are the portions different from those in the flowchart of the process of transmitting and receiving data between electronic data storage apparatuses in the same group as shown in FIG. 4. First, a transmitting electronic data storage apparatus receives an instruction to communicate with an electronic data storage apparatus belonging to a different group in step S31, and a process in steps S16 through S18 is performed similarly as in FIG. 4. Then, the key management unit 12 selects a public key stored by the public key storage unit 16 in step S32, an encrypting process is performed using the public key in step S33, and the result is transmitted to the receiving electronic data storage apparatus in step S21.

In the receiving electronic data storage apparatus, the key management unit 12 selects a private key which is a pair to a public key stored in the public key storage unit 16 in step S36 after receiving data in step S24, and the encryption unit 13 decrypts the data and verifies the contents of the data using the public key encryption algorithm in step S37.

If it is verified that no amendments have been made to the electronic data, then the process in steps S27 through S29 is performed similarly as in FIG. 4, thereby terminating the process. In this case, an electronic document can be processed in a common method such as PEM (privacy enhanced mail) through which an electronic signature is transmitted using a private key from the transmitting apparatus and simultaneously a document encrypted using a public key is transmitted from the receiving apparatus. Otherwise, communications can also be established by temporarily sharing a session key based on the D-H (Diffie-Hellman system) in addition to the public keys of the transmitting apparatus and the receiving apparatus.

The PEM is an electronic mail system with enhanced security which is proposed as a preferred standard for the Internet. In the PEM, the DES (data encryption standard) process is used in encrypting a document. The PEM has the feature that a destination can be authenticated.

The D-H method is a public key distribution method suggested by Diffie and Hellman, and has the feature of secretly sharing a key between two parties.

As described by referring to FIGS. 4 and 5, when data is transmitted and received between electronic data storage apparatuses in the same or different groups, the data stored after being encrypted using an individual key by the transmitting apparatus is transmitted after being re-encrypted using a group key for the same group, and using a public key for different groups. In the receiving apparatus, data is verified using a group key for the same group, and using a public key for different groups, and is then stored after being re-encrypted using an individual key. As a result, for example, although there is the possibility that a group key is disclosed, the electronic data stored in each electronic data storage apparatus can be secured.

Figure 6:
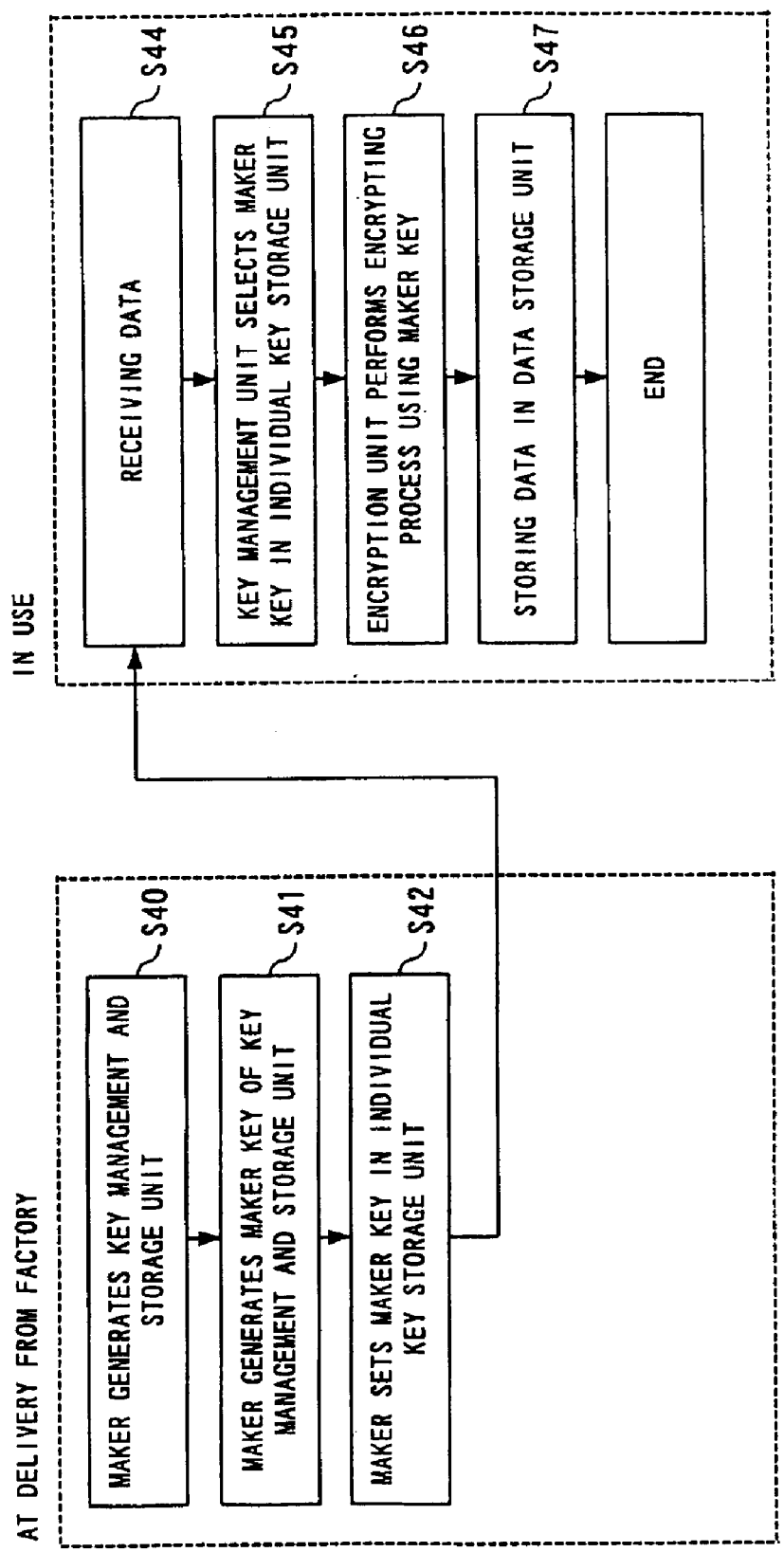
FIG. 6 is a flowchart of the process of storing electronic data when an individual key is preliminarily assigned.

The flowchart of generating and managing a key stored by each electronic data storage apparatus is described below by referring to FIGS. 6 through 10. FIG. 6 is a flowchart of the data storing process performed when an individual key of each electronic data storage apparatus is preliminarily assigned. A key preliminarily assigned to an electronic data storage apparatus refers to, for example, a key assigned to each apparatus when the electronic data storage apparatus is delivered for sale from a factory. Since the key is managed by its maker, it is called a maker key.

In FIG. 6, an electronic data storage apparatus having the function of managing a key is generated by its maker in step S40 at the delivery from the factory, and the maker generates a maker key for the electronic data storage apparatus in step S41. In step S42, the electronic data storage apparatus is delivered after the maker key is set in the individual key storage unit 14. The maker key is managed by the maker together with the identification information about the electronic data storage apparatus, for example, its ID.

When the electronic data storage apparatus is used, electronic data is received in step S44, the key management unit 12 selects the maker key stored by the individual key storage unit 14 in step S45, the encryption unit 13 encrypts electronic data using the maker key in step S46, and the data storage unit 17 stores the data in step S47, thereby terminating the process.

Thus, by using a maker key managed by the maker as an individual key of an electronic data storage apparatus, it is not necessary for a user to manage a key. In addition, the disclosure of the key can be minimized on the user side. Although the encryption unit 13 of the electronic data storage apparatus on the user side has become out of order, the data in the electronic data storage apparatus can be reconstructed using the maker key managed by the maker.

Figure 7:
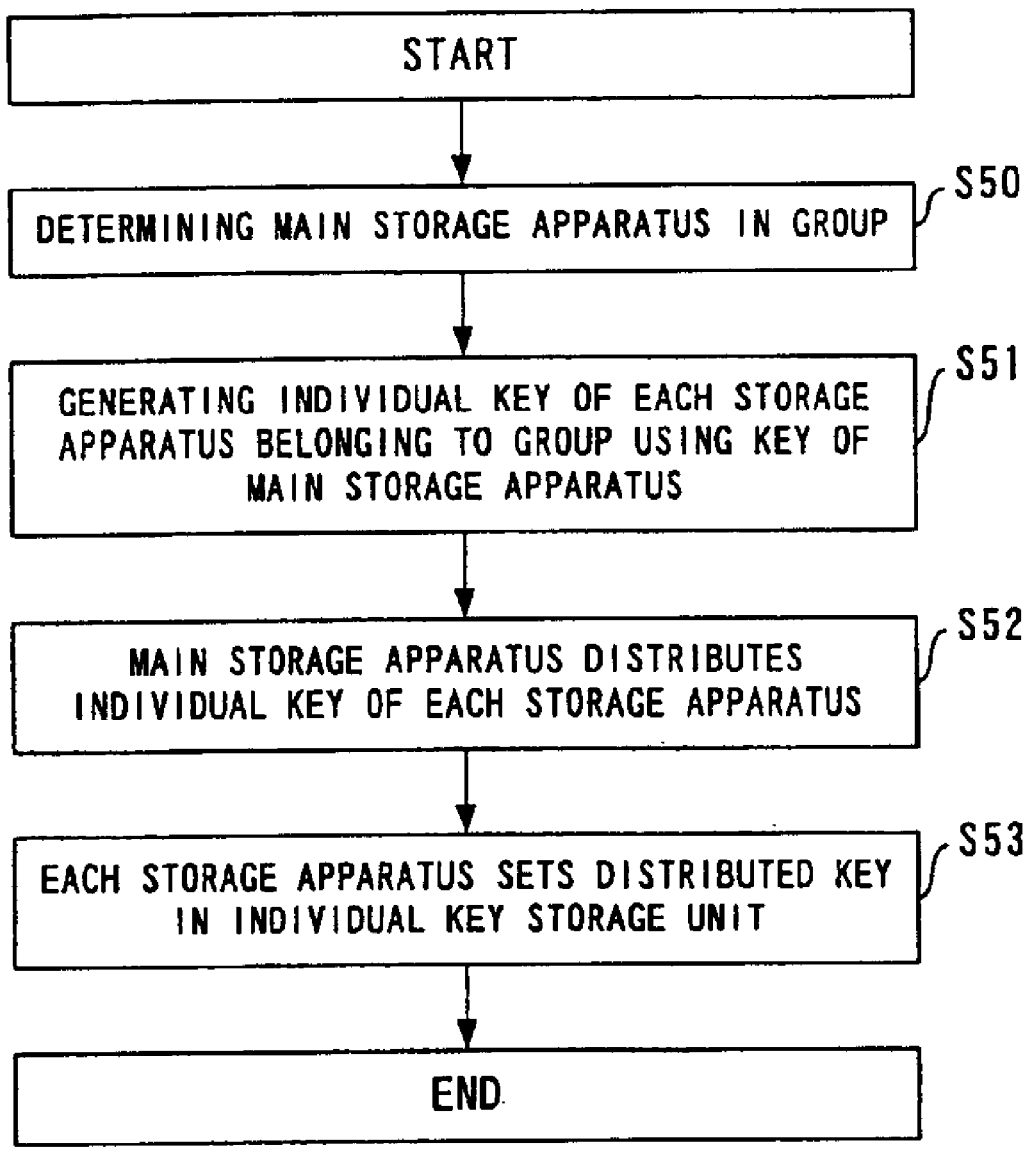
FIG. 7 is a flowchart of the process of managing an individual key of the electronic data storage apparatus by a group master.

FIG. 7 is a flowchart of the process of managing an individual key of an electronic data storage apparatus by a main electronic data storage apparatus in a group, for example, a group master. When the process starts as shown in FIG. 7, a main electronic data storage apparatus, for example, a group master is determined in a group of a plurality of electronic data storage apparatuses in step S50. In step S51, an individual key of each electronic data storage apparatus belonging to the group is generated using the key of the group master. In step S52, the individual key of each electronic data storage apparatus generated by the group master is distributed. In step S53, each electronic data storage apparatus sets the distributed key in its individual key storage unit 14, thereby terminating the process. The method of the group master generating each individual key and distributing the key is described later.

Figure 8:
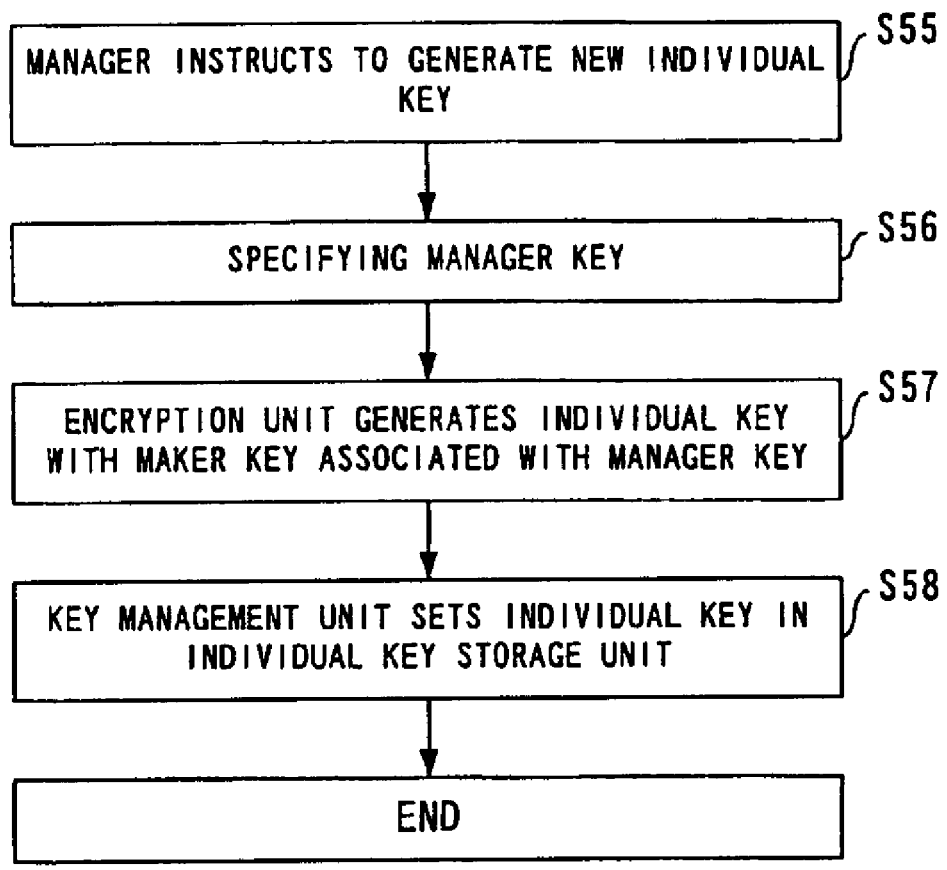
FIG. 8 is a flowchart of the process of generating an individual key with two keys associated with each other.

FIG. 8 is a flowchart of the process of generating an individual key with two keys associated with each other. The two keys refer to, for example, a key preliminarily assigned to an electronic data storage apparatus, and a newly specified key. The preliminarily assigned key is, for example, the above described maker key. The newly specified key is set by a manager who uses the electronic data storage apparatus, and is referred to as a manager key. Unlike a user, a manager can also sets an individual key and a group key. The user can only store, refer to, and transfer electronic data.

In FIG. 8, when an instruction to generate a new individual key is issued by a manager in step S55, the manager specifies a manager key in step S56, and an individual key is generated with the above described maker key associated with the manager key by the encryption unit 13 in step S57. In step S58, the key management unit 12 sets the generated individual key in the individual key storage unit 14, thereby terminating the process. The process of generating an individual key with a maker key associated with a manager key is described later.

Thus, by associating a maker key with a manager key when an individual key of an electronic data storage apparatus is generated, a manager can manage electronic data storage apparatuses depending on a change in organization, settings of a group, an environment, and an operation mode. Furthermore, when an encryption unit becomes out of order, the maker can reconstruct and verify data as described above.

Figure 9:
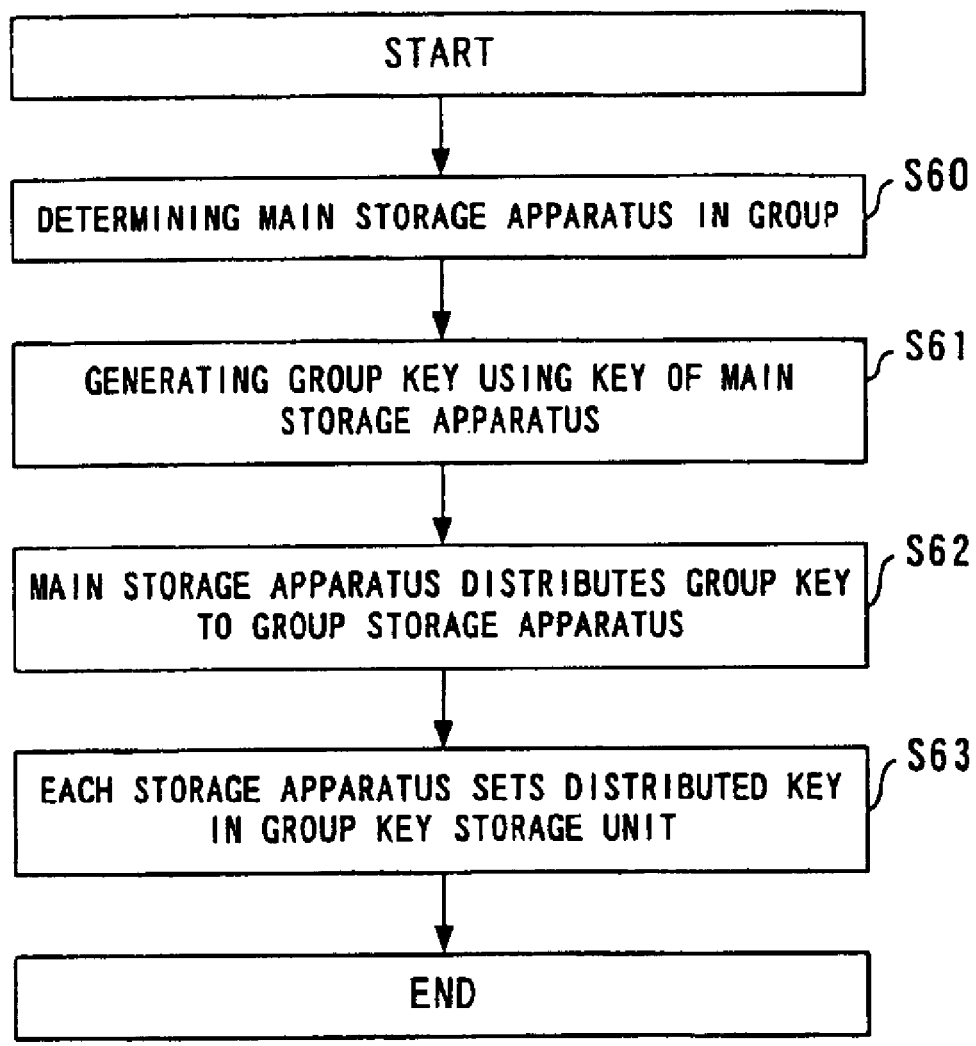
FIG. 9 is a flowchart of managing a group key by a group master.

FIG. 9 is a flowchart of managing a group key by a group master. A group key is used in transmitting and receiving electronic data in a group as described above. The flowchart shown in FIG. 9 is the same as the flowchart of the process of managing an individual key by a group master shown in FIG. 7.

That is, after determining a group master in step S60, a group key is generated by the group master in step S61. In step S62, the group key is distributed to the electronic data storage apparatuses in the group. In step S63, each electronic data storage apparatus sets the distributed group key in its own group key storage unit 15, thereby terminating the process.

Figure 10:
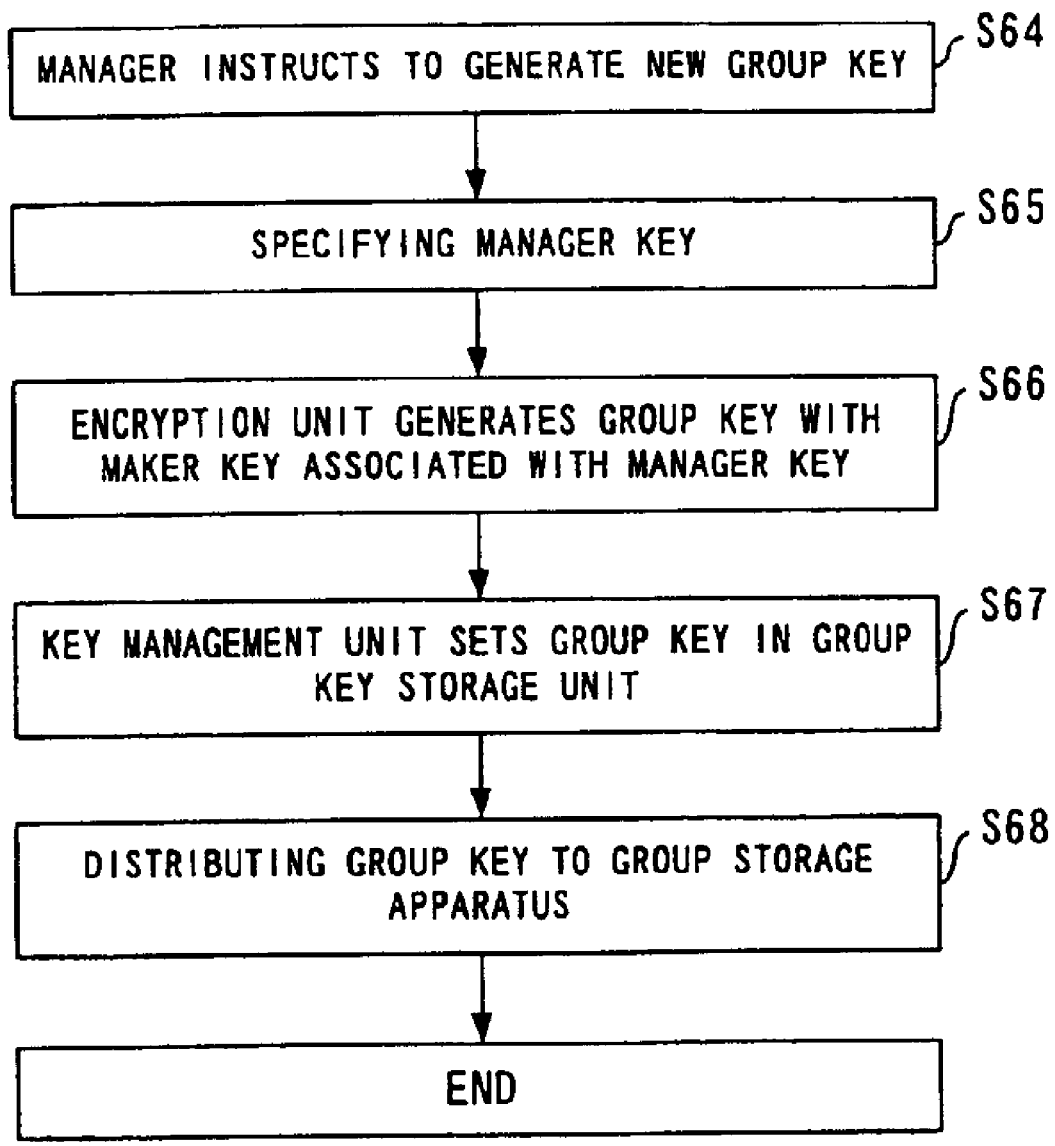
FIG. 10 is a flowchart of the process of generating a group key with two keys associated with each other.

FIG. 10 is a flowchart of the process of generating a group key with two keys associated with each other as in FIG. 8 in which two keys refer to a maker key and a manager key.

The first two steps in FIG. 10 are the same as those in FIG. 8. Then, in step S66, the encryption unit 13 generates a group key with a maker key associated with a manager key. In step S67, the key management unit 12 sets a group key in the group key storage unit 15. In step S68, the group key is distributed to the electronic data storage apparatuses belonging to the group, thereby terminating the process. The process according to the flowchart is performed by, for example, the above described group master.

Figure 11:
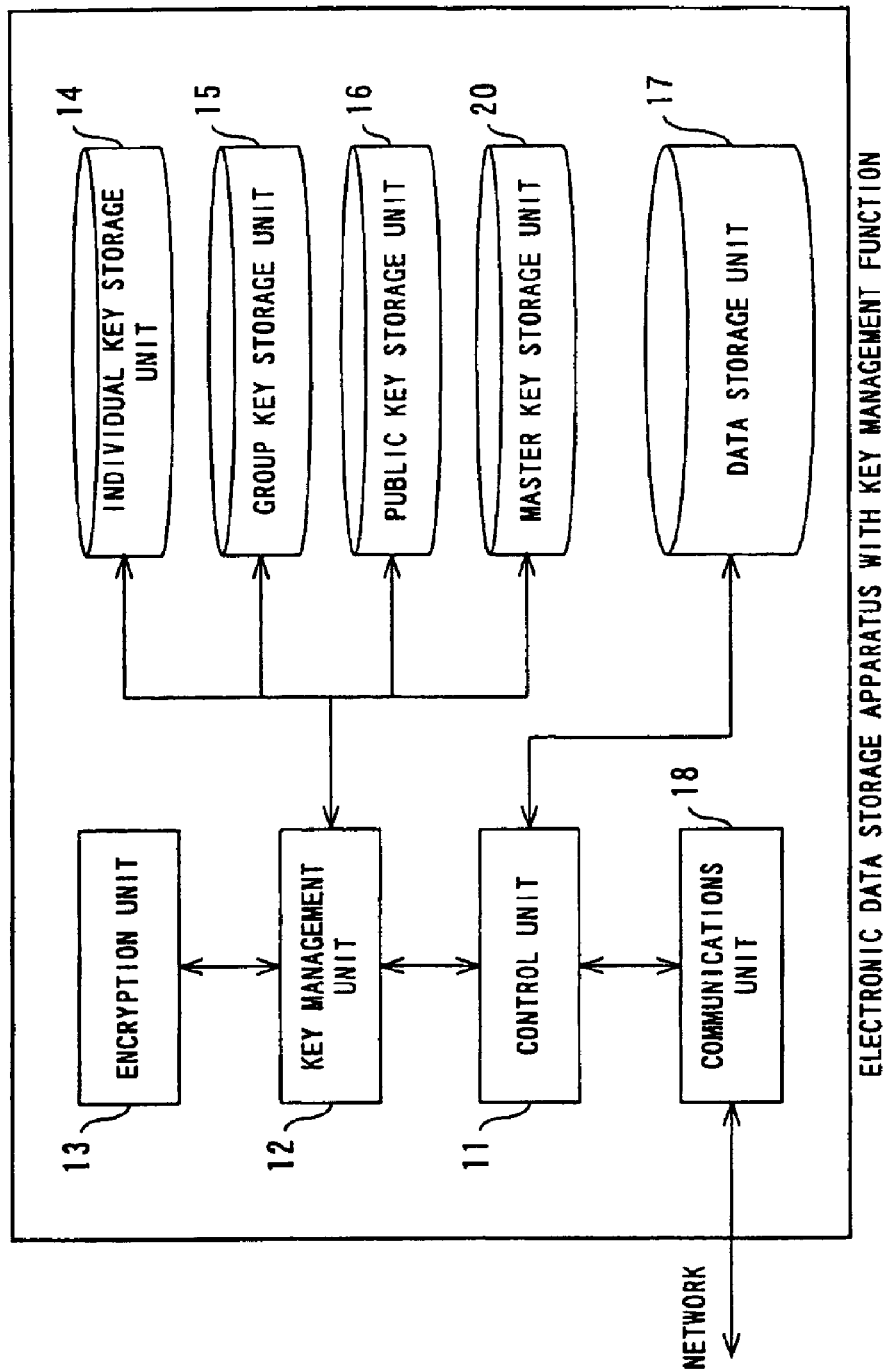
FIG. 11 is a block diagram of the configuration of the electronic data storage apparatus according to the second embodiment of the present invention.

FIG. 11 is a block diagram of the configuration of the electronic data storage apparatus according to the second embodiment of the present invention. As compared with the configuration according to the first embodiment shown in FIG. 2, an master key storage unit 20 for storing a master key which is a common key shared by all electronic data storage apparatuses is the only difference from the configuration according to the first embodiment.

Figure 12:
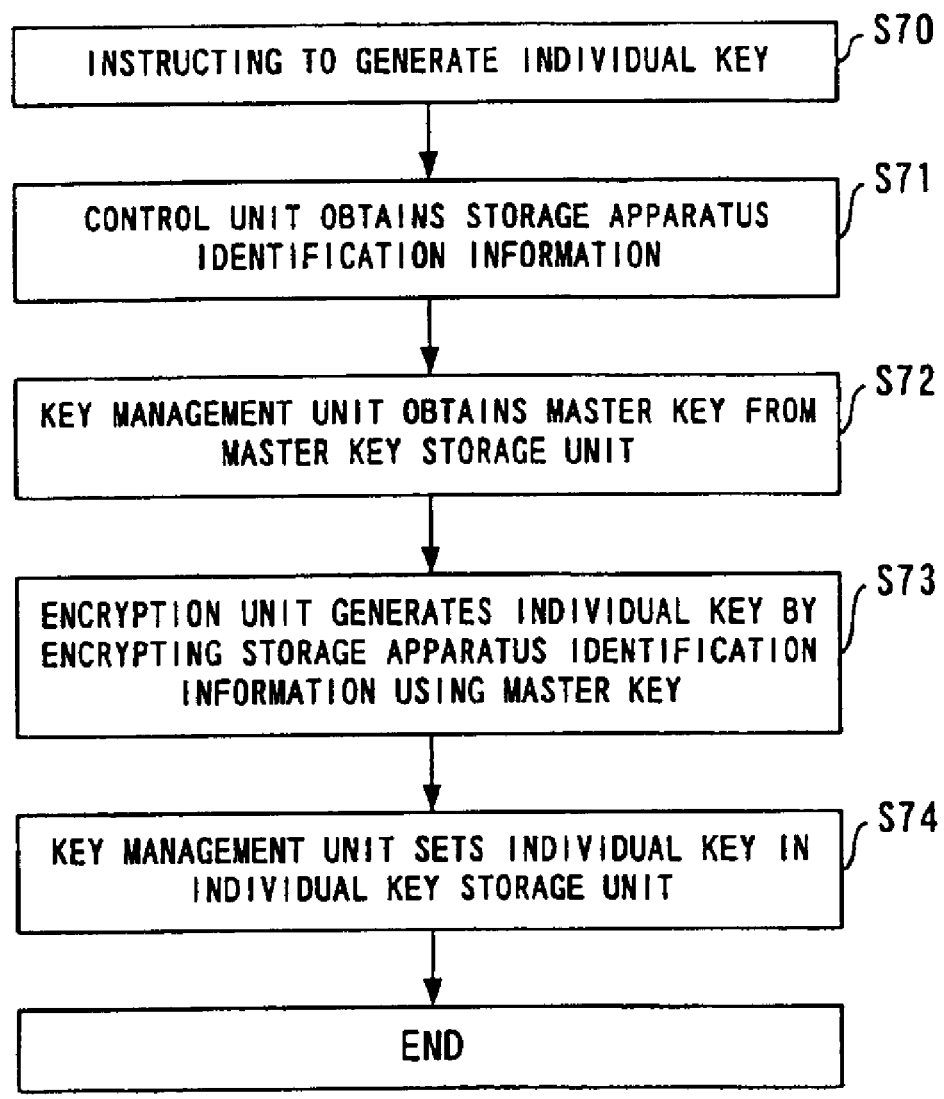
FIG. 12 is a flowchart of the process of generating an individual key using a master key according to the second embodiment of the present invention.

FIG. 12 is a flowchart of the process of generating an individual key using a master key according to the second embodiment of the present invention. In FIG. 12, when an instruction to generate an individual key is received in step S70, the identification information about each electronic data storage apparatus, for example, an ID of the electronic data storage apparatus, is obtained by the control unit 11 in step S71, and a master key stored in the master key storage unit 20 is obtained by the key management unit 12 in step S72. In step S73, the encryption unit 13 encrypts the electronic data storage apparatus identification information using the master key, and an individual key is generated. The encrypting process is described later. Then, in step S74, the key management unit 12 sets the generated individual key in the individual key storage unit 14, thereby terminating the process.

Thus, an individual key can be automatically generated by each electronic data storage apparatus by each apparatus generating each individual key using the master key shared by all electronic data storage apparatuses. In addition, a maker of electronic data storage apparatuses can verify and reconstruct the stored data by referring to the identification information about each electronic data storage apparatus when, for example, its encryption unit becomes out of order.

Figure 13:
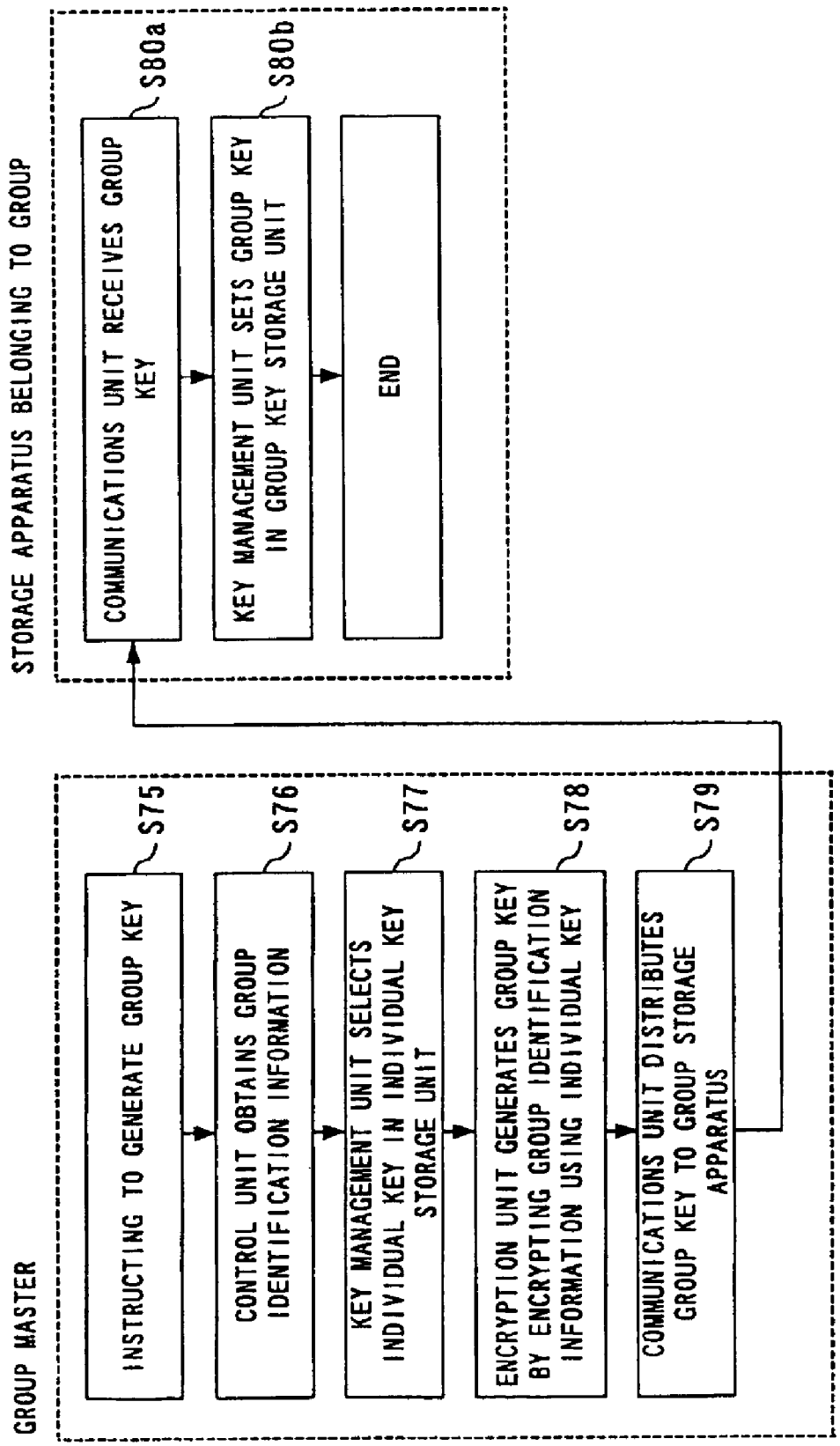
FIG. 13 is a flowchart of the process of generating a group key according to the second embodiment of the present invention.

FIG. 13 is a flowchart of the process of generating and distributing a group key according to the second embodiment of the present invention. In this process, no master keys are used, and the similar process can be performed according to the first embodiment of the present invention.

When an instruction to generate a group key is issued to a group master in step S75 shown in FIG. 13, the control unit 11 of the group master obtains group identification information in step S76. The group identification information is an ID for identifying the group managed by the group master. In step S77, the key management unit 12 selects an individual key stored by the individual key storage unit 14, and the encryption unit 13 generates a group key by encrypting the group identification information using the individual key in step S78. In step S79, the generated group key is distributed from the communications unit 18 to the electronic data storage apparatuses in the group.

In the electronic data storage apparatus which belongs to the group and is managed by the group master, the communications unit 18 receives the group key in step S80a, and the key management unit 12 sets the group key in the group key storage unit 15 in step S80b, thereby terminating the process.

Figure 14:
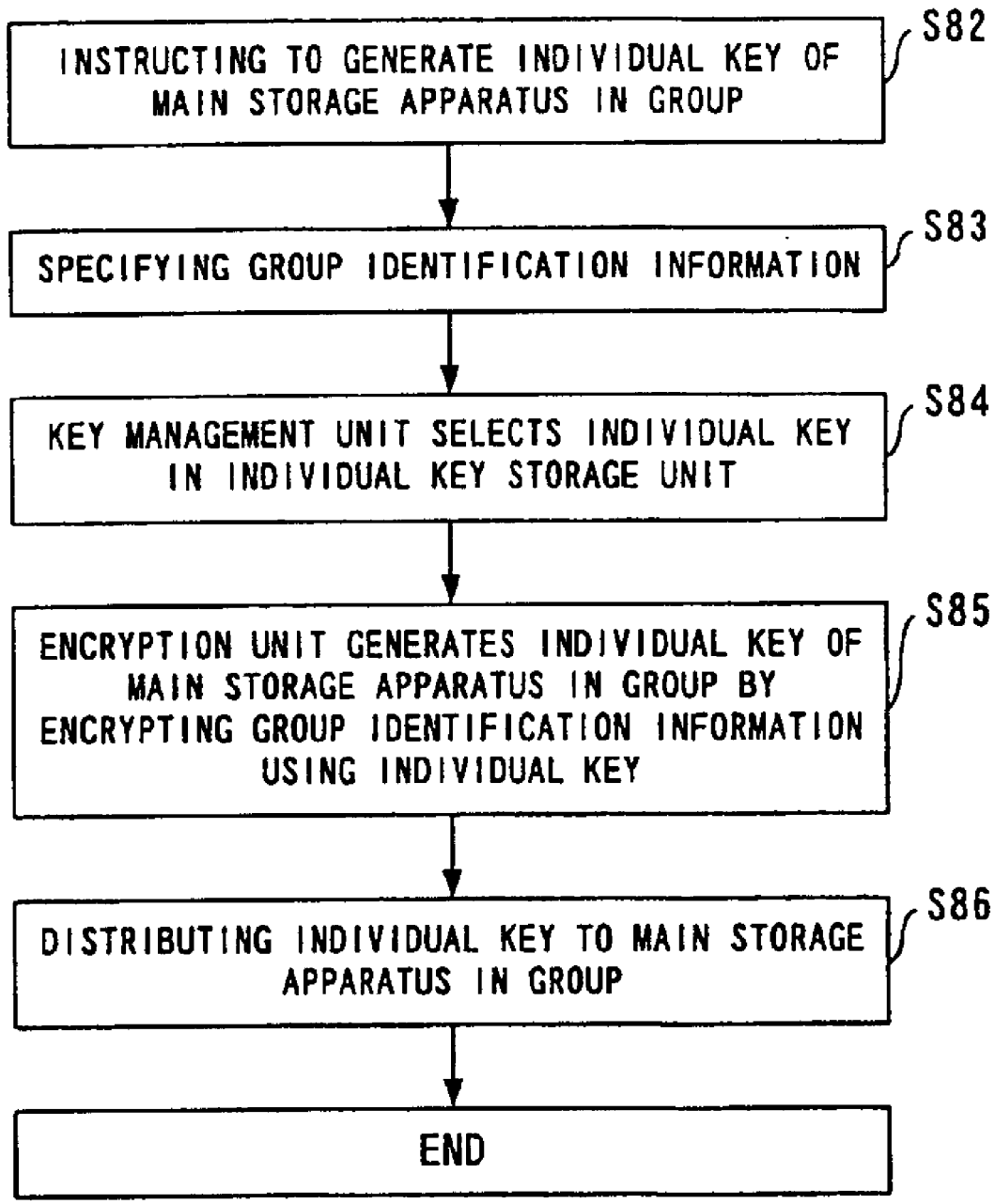
FIG. 14 is a flowchart of the process of generating an individual key of a group master by a group management and electronic data storage apparatus.

FIG. 14 is a flowchart of the process of generating an individual key of a group master by a group management and electronic data storage apparatus. A group management and electronic data storage apparatus manages main electronic data storage apparatuses in a plurality of groups, that is, manages a plurality of group masters. The group management and electronic data storage apparatus generates an individual key for each group master, and distributes it to the group master.

In instruction to generate an individual key of a group master is received in step S82. In step S83, group identification information is specified for each of a plurality of groups. In step S84, the key management unit 12 selects an individual key stored in the individual key storage unit 14. In step S85, the encryption unit 13 encrypts each piece of the group identification information using the individual key, and an individual key for each group master is generated. In step S86, the individual key is distributed to each group master, thereby terminating the process.

Figure 15:
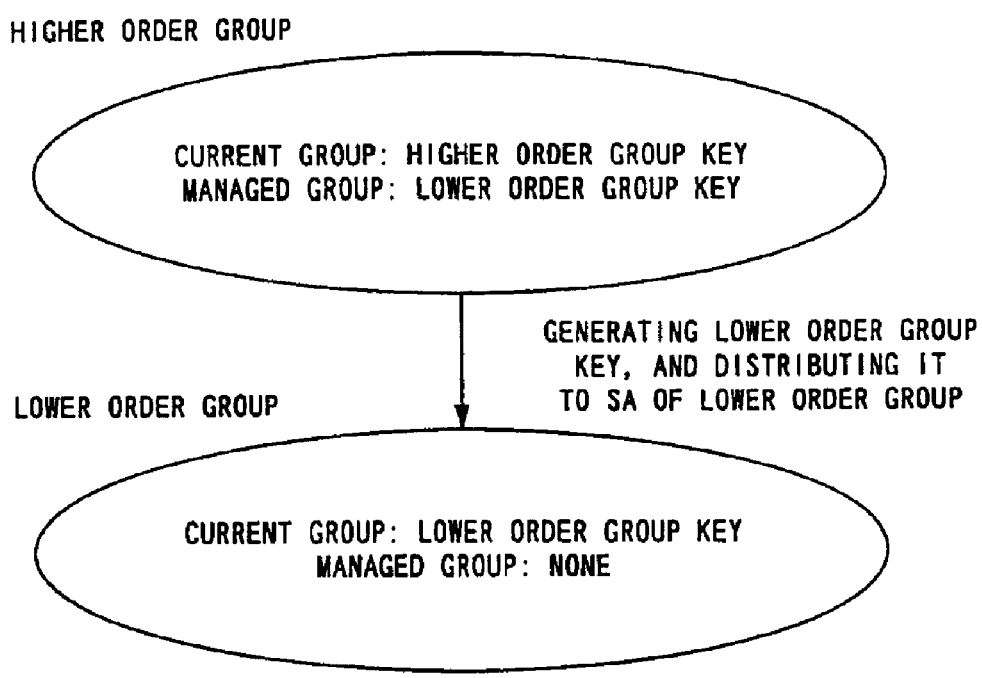
FIG. 15 shows the hierarchy of groups.

Described below is the hierarchy of groups. For example, in FIG. 3, a plurality of groups of electronic data storage apparatuses are equal to each other according to the first and the second embodiments of the present invention. FIG. 15 shows the case in which a group is designed to form a hierarchy of higher and lower order groups.

In FIG. 15, a higher order group manages a lower order group to be managed. An electronic data storage apparatus (SA) belonging to the higher order group stores, for example, a higher order group key for the group to which it belongs, and a lower order group key which is a key of the lower order group which it manages. On the other hand, an electronic data storage apparatus belonging to the lower order group stores only the lower group key for the group to which it belongs. Then, for example, in the higher order group, the lower order group master SA for managing the lower order electronic data storage apparatuses generates a lower order group key and distributes it to the electronic data storage apparatuses SA in the lower order group. The SA is short for a secure archiver, and refers to an electronic data storage apparatus.

Figure 16:
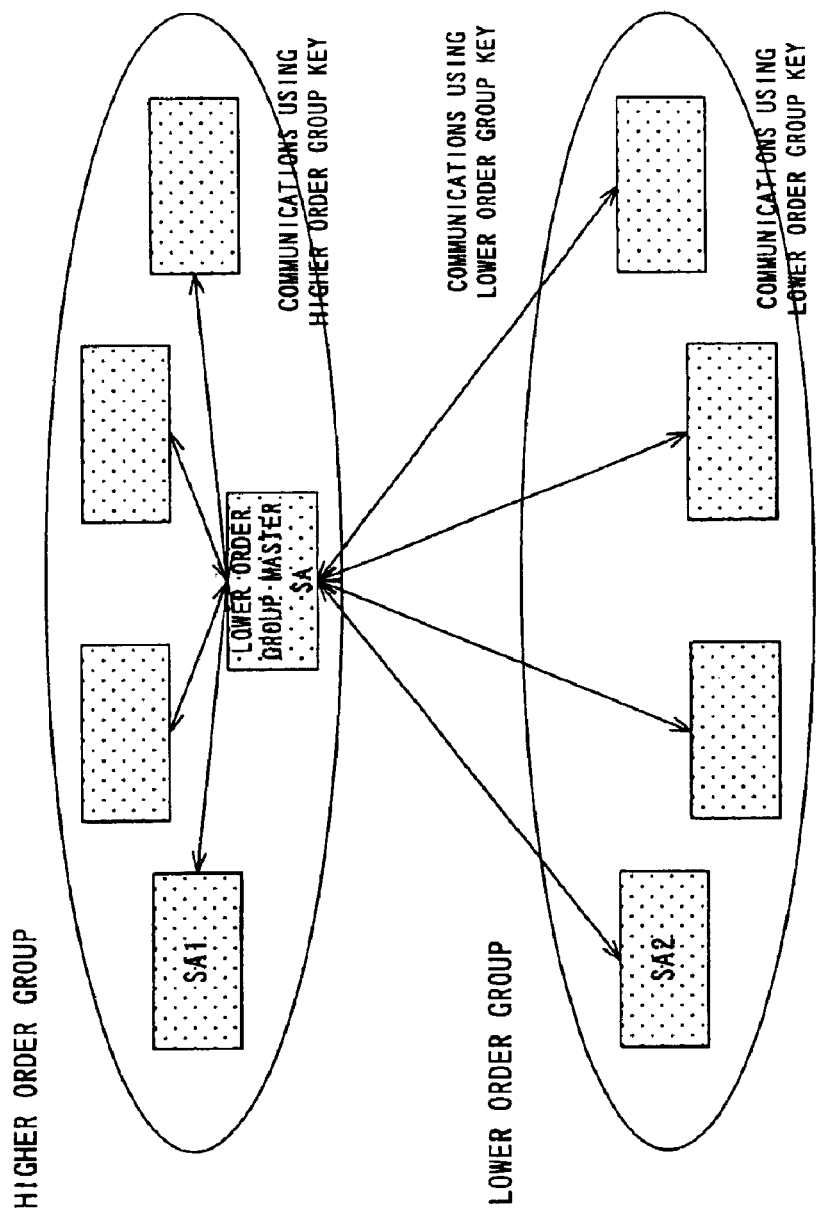
FIG. 16 shows the communications of the electronic data storage apparatuses between a higher order group and a lower order group.

FIG. 16 shows the communicating method between two groups related in a hierarchical structure. The communications between the SAs in a higher order group are established using a higher order group key whereas the communications between the SAs in a lower order group are established using a lower order group key. The communications between an SA of a higher order group, for example, an SA 1, and an SA of a lower order group, for example, an SA 2, are established through a lower order group master SA which is one the SAs of the higher order group and manages the SAs of the lower order group. The communications between the lower order group master SA and an SA belonging to the lower order group, for example, the SA 2 are established using a lower order group key.

If the lower order group master SA belongs to a management unit of an organization, then a hierarchical group can be realized by the SA of the management unit generating, distributing, and managing an individual key of an SA or a group key of each department, etc. The data stored in each SA can be verified by the management unit.

Figure 17:
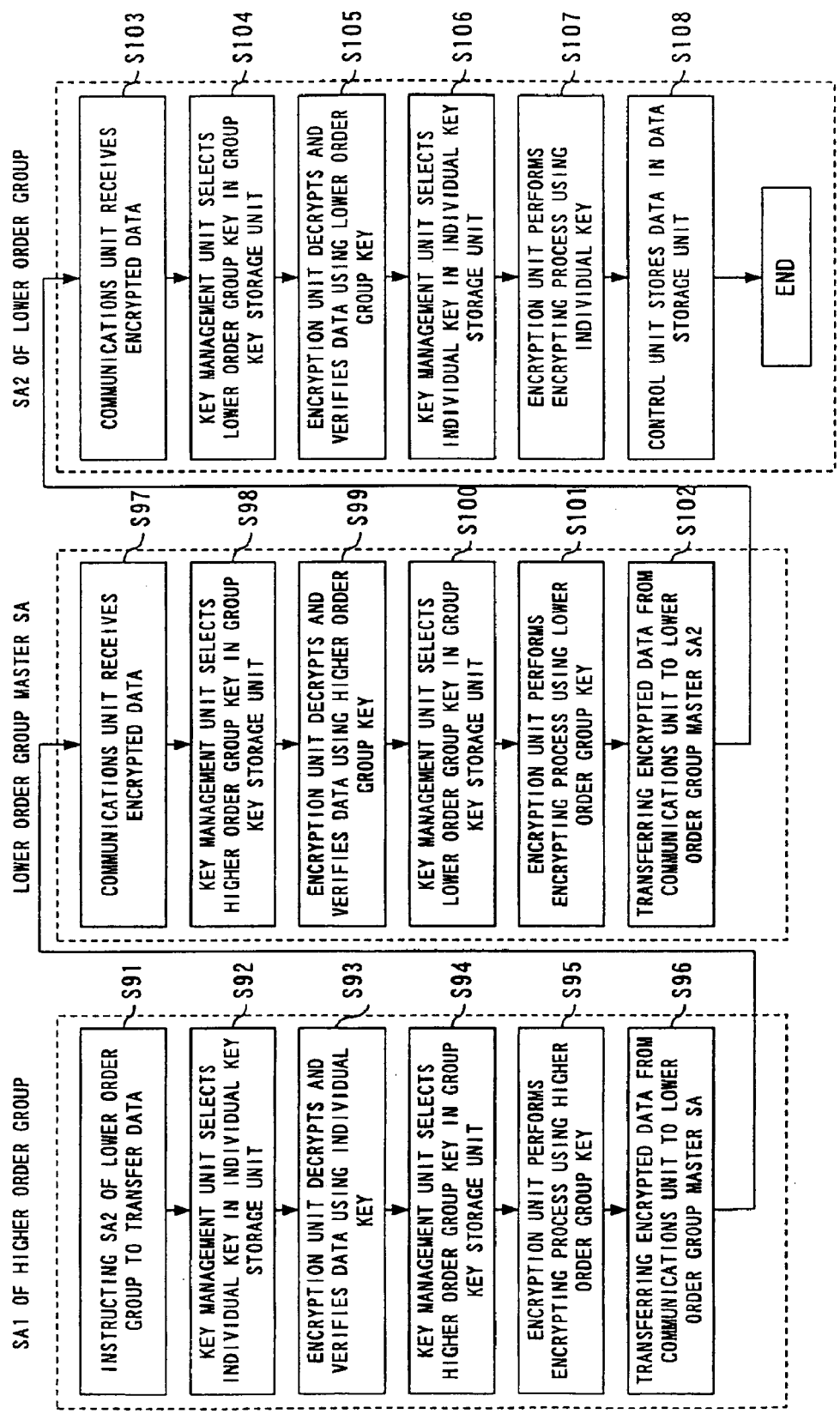
FIG. 17 is a flowchart of the process of transmitting data from a storage apparatus in a higher order group to a storage apparatus in a lower order group.

FIG. 17 is a flowchart of the process of transmitting data from an SA 1 in a higher order group to an SA 2 in a lower order group. When an instruction to transfer data from the SA 1 of the higher order group to the SA 2 of the lower order group is issued in step S91 shown in FIG. 17, the key management unit 12 shown in FIG. 2 selects an individual key stored in the individual key storage unit 14 in step S92, and the encryption unit 13 decrypts and verifies data using the individual key. Then, the key management unit 12 selects the higher order group key stored in the group key storage unit 15 in step S94. In step S95, the encryption unit 13 encrypts the electronic data using the higher order group key. In step S96, the encrypted electronic data is transferred from the communications unit 18 to the lower order group master SA.

In the lower group master SA, the communications unit 18 receives the encrypted data in step S97, and the key management unit 12 selects the higher order group key stored in the group key storage unit 15 in step S98. In step S99, the encryption unit 13 decrypts and verifies the electronic data using the higher order group key. In step S100, the key management unit 12 selects the lower order group key stored in the group key storage unit 15. In step S101, the encryption unit 13 encrypts data using the lower order group key. In step S102, the communications unit 18 transfers the encrypted data to a lower order group SA 2.

In the lower order group SA 2, the communications unit 18 receives the encrypted data in step S103, and the key management unit 12 selects the lower order group key stored in the group key storage unit 15 in step S104. In step S105, the encryption unit 13 decrypts and verifies the electronic data using the lower order group key. In step S106, the key management unit 12 selects the individual key stored in the individual key storage unit 14. In step S107, the encryption unit 13 encrypts data using the individual key. In step S108, the control unit 11 stores data in the data storage unit 17, thereby terminating the process.

Figure 18:
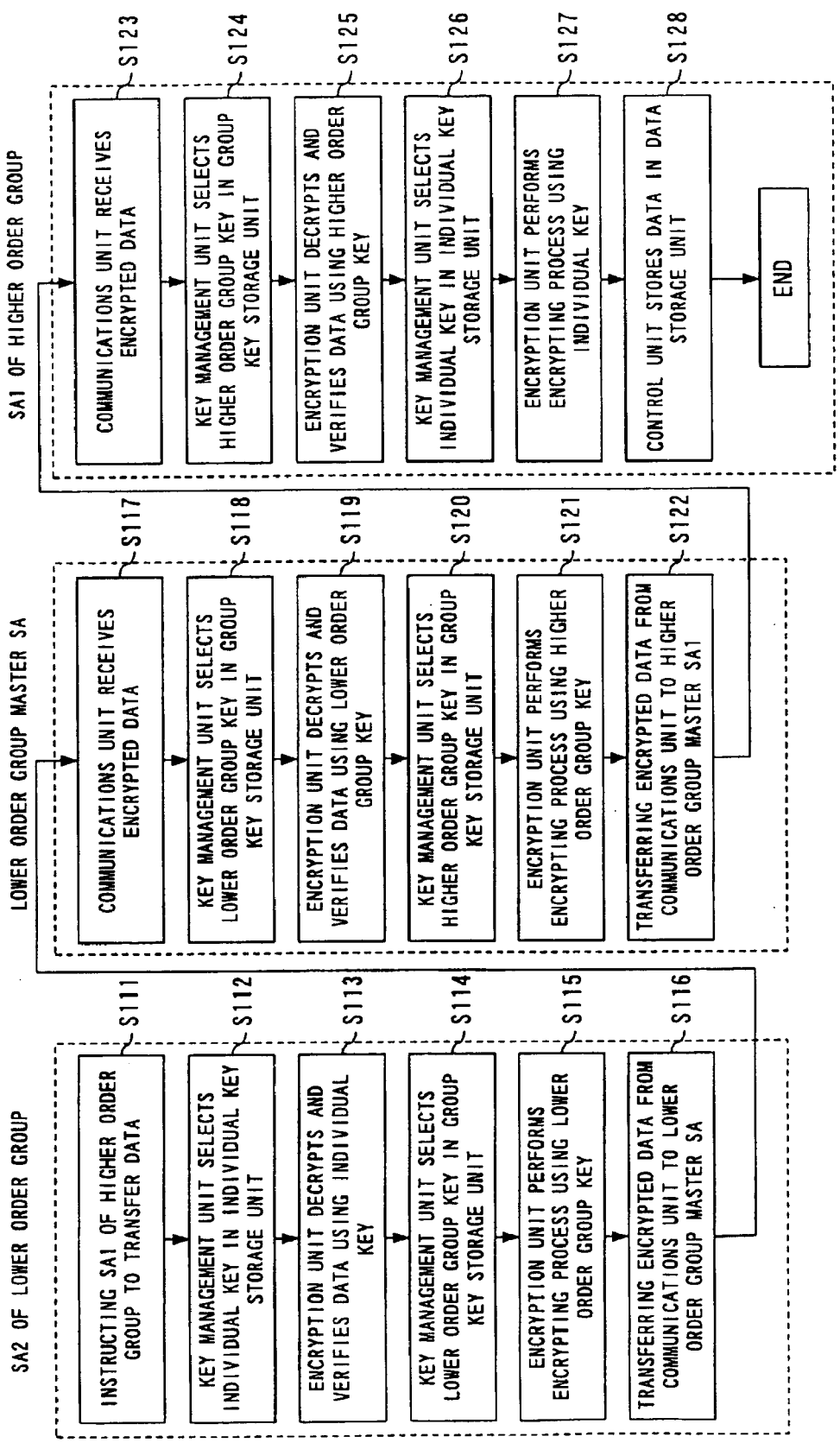
FIG. 18 is a flowchart of the, process of transmitting data from a storage apparatus in a lower order group to a storage apparatus in a higher order group.

FIG. 18 is a flowchart of the process of transmitting data from a lower order group SA 2 to a higher order group SA 1. The flowchart shows the reverse process of the process shown in FIG. 17. That is, the data transmitting SA 2 performs the process using an individual key and a lower order group key, and the lower order group master SA decrypts and verifies data using a lower order group key, and then encrypts the data using a higher order group key. The receiving SA 1 performs the process using a higher order group key and an individual key.

In the description of the process shown in FIG. 17, the configuration of the electronic data storage apparatus according to the first embodiment is described. However, the processes shown in FIGS. 17 and 18 are similarly performed in the electronic data storage apparatus according to the second embodiment described by referring to FIG. 2.

Described below are the methods of storing electronic data (electronic documents) using an individual key, utilizing a group key in a group, generating amendment detection information (message authentication code (MAC)) for the electronic data, generating a key, etc.

Figure 19:
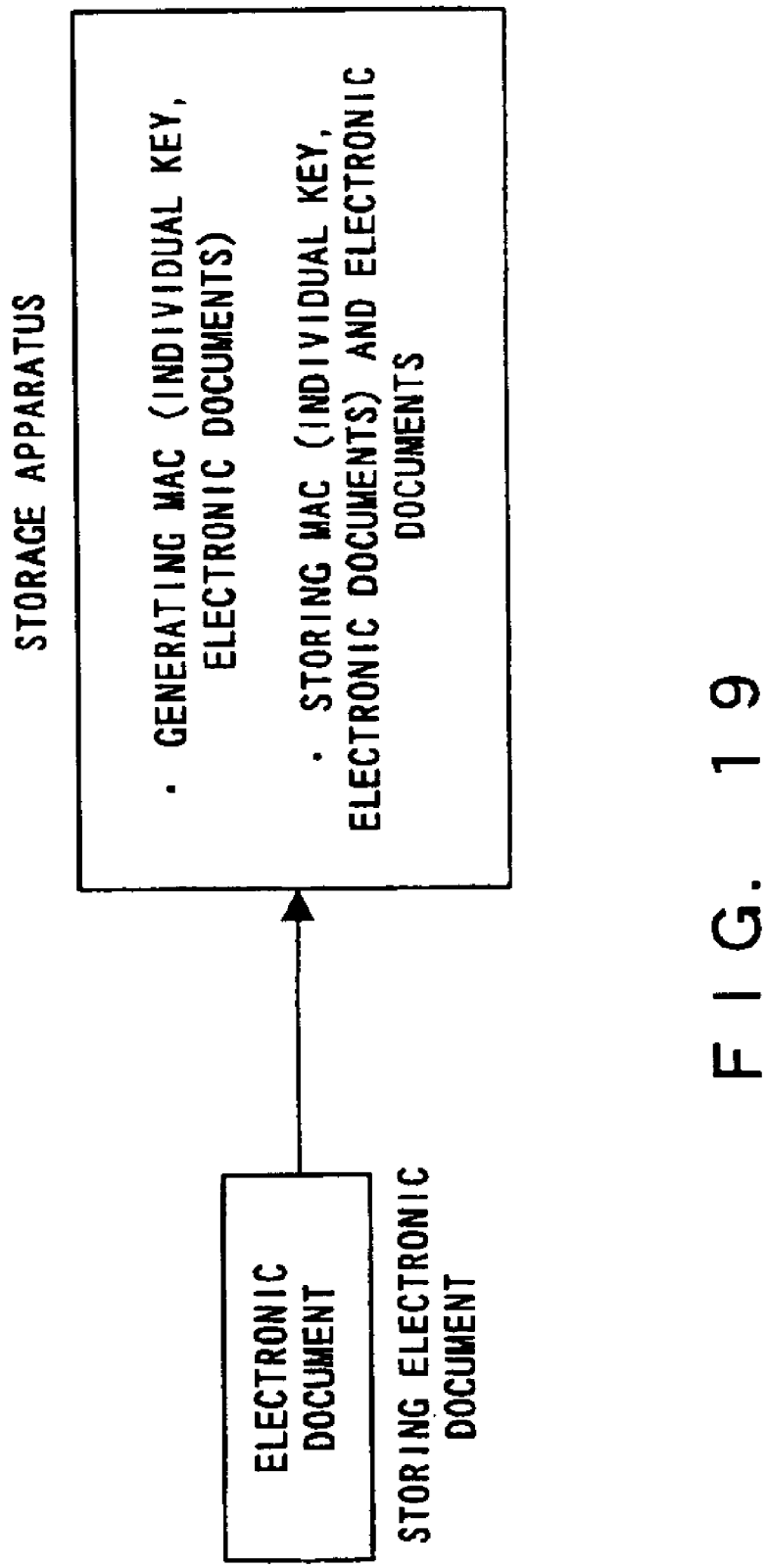
FIG. 19 shows the storage of an electronic document using an individual key.

FIG. 19 shows the method of storing an electronic document using an individual key. In FIG. 19, when an instruction to store an electronic document is issued to an electronic data storage apparatus, a MAC is generated using the individual key and the electronic document, and the MAC and the electronic document are stored.

Figure 20:
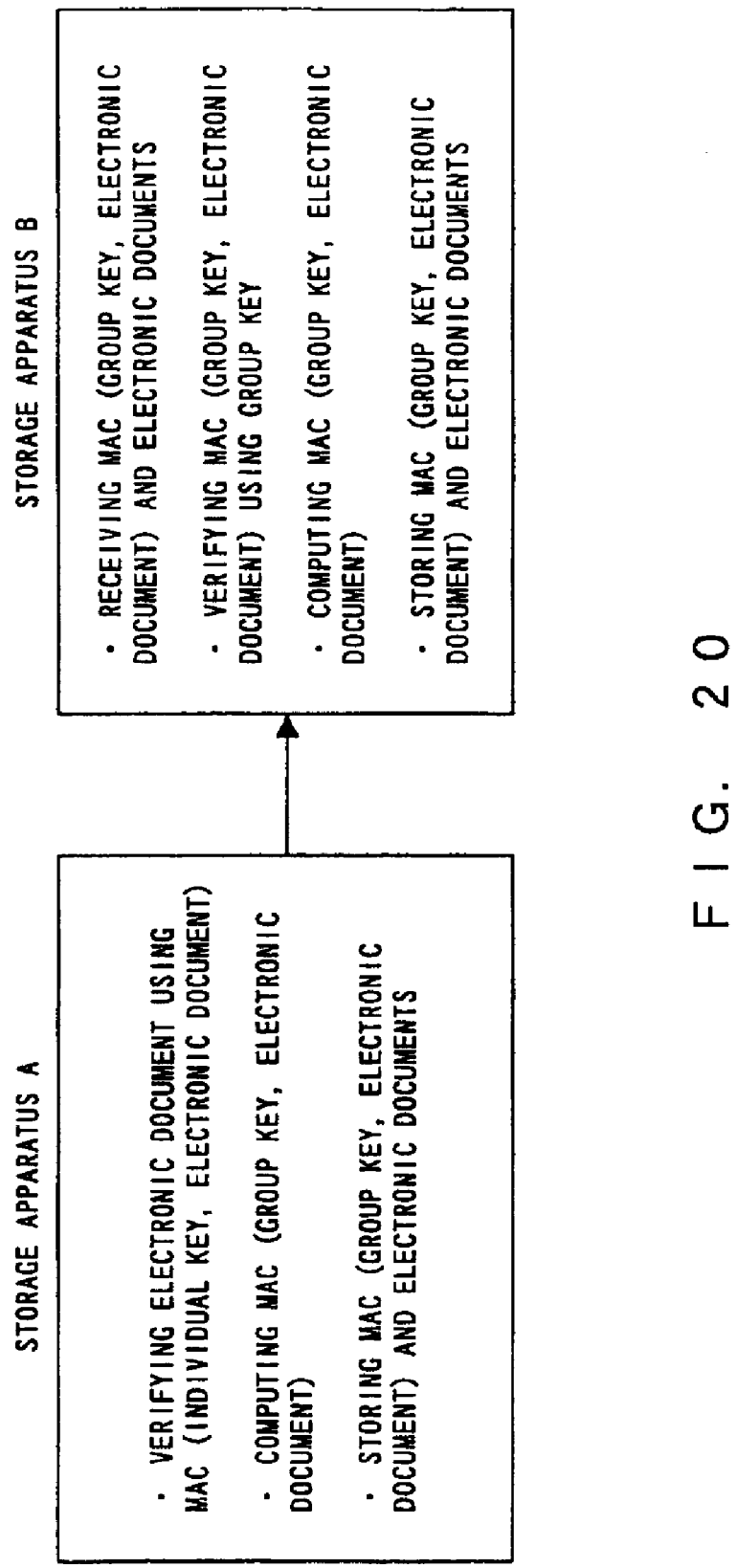
FIG. 20 shows the process of transmitting and receiving data between two storage apparatuses belonging to the same group.

FIG. 20 shows the process of transmitting and receiving data between two electronic data storage apparatuses belonging to the same group. In FIG. 20, the transmitting electronic data storage apparatus A re-computes the MAC, verifies an electronic document, computes the MAC corresponding to a group key and the electronic document, and transmits the MAC and the electronic document to the electronic data storage apparatus B.

Then, the electronic data storage apparatus B receives the MAC and the electronic document, verifies the contents of the MAC using the group key, computes the MAC corresponding to the individual key and the electronic document if the verification result is correct, and stores the computed MAC and the electronic document.

Figure 21:
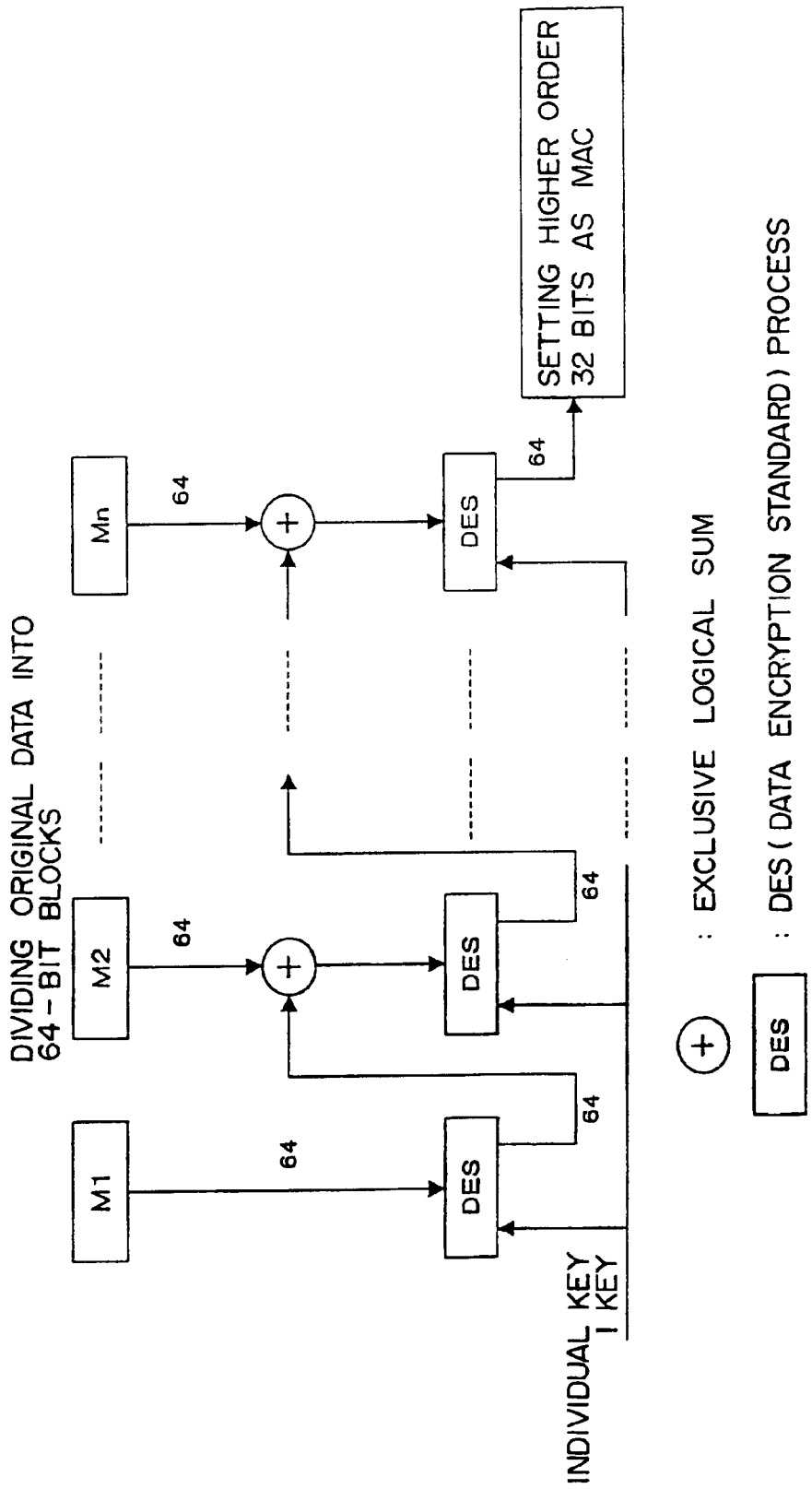
FIG. 21 shows the method of computing amendment detection information MAC.

FIG. 21 shows the method of computing amendment detection information MAC for electronic data described by referring to FIGS. 19 and 20. In computing the MAC, the DES (data encryption standard) adopted by the US Standard Institute for use in encrypting electronic data is used. In this encrypting method, the encrypting/decrypting process can be performed by one LSI.

In FIG. 21, the original data is divided into 64-bit blocks M1, M2, . . . , Mn. The DES process is performed on the first 64-bit block M1 using a key, for example, an individual key. An exclusive logical sum of the resultant 64-bit data and the next 64-bit block M2 is obtained.

Then, the DES process is performed again on the result using, for example, an individual key, and a 64-bit result is obtained. The similar process is continued. Among the resultant 64-bit results, the higher order 32 bits are obtained as the amendment detection information MAC. The computation of the amendment detection information MAC is not limited to the above described method, but can be obtained using other algorithms.

Figure 22:
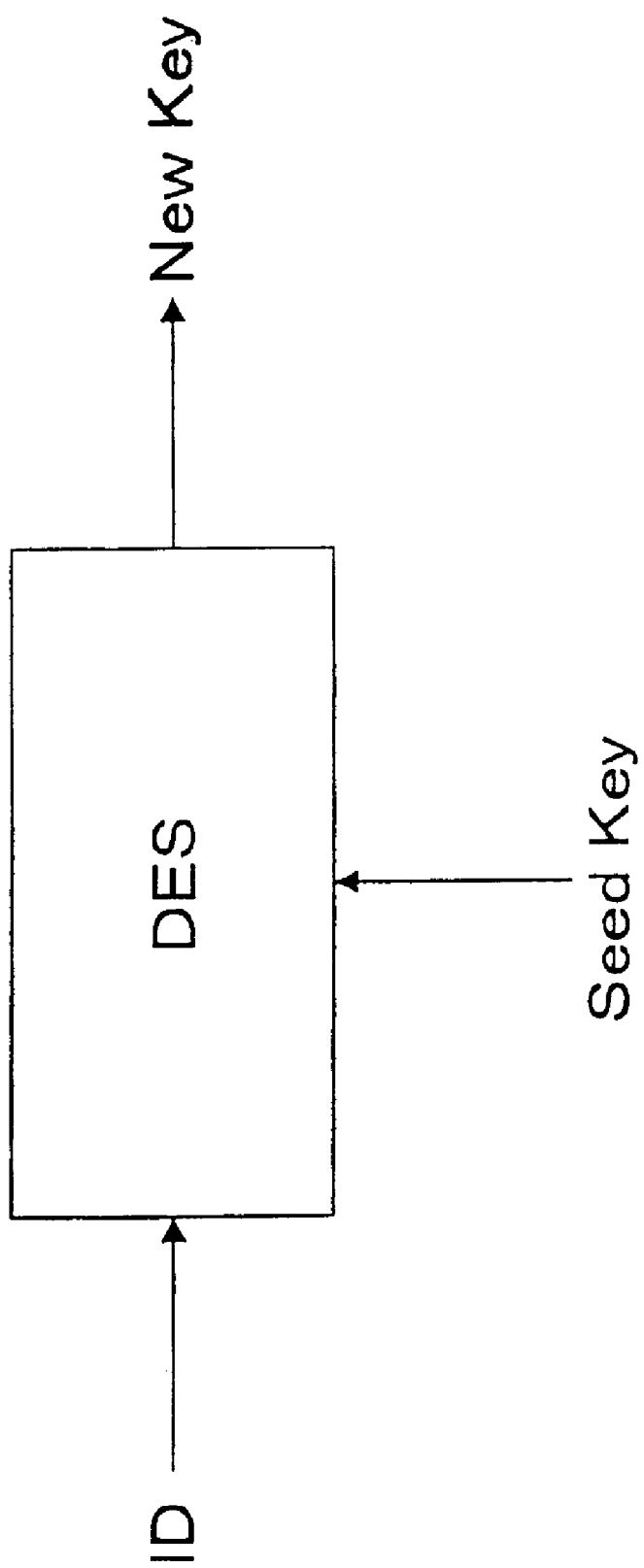
FIG. 22 shows the method of generating a key.

FIG. 22 shows a common method of generating a key. In FIG. 22, for example, when the above described group master generates and distributes an individual key of an electronic data storage apparatus belonging to its group, the DES process is performed using the information identifying each electronic data storage apparatus, for example, an ID and an individual key of the group master as a seed key. An individual key corresponding to each storage apparatus can be generated and distributed as a new key. As described above, a new key can be similarly generated with two keys, for example, a maker key and a manager key, associated with each other.

An individual key can be distributed online using a key distributing server or a GKMF (group key management frame work) based on the authentication using a public key. A medium such as a floppy disk, an IC card, etc. can also be used to distribute the key offline.

The GKMF is performed to set and manage a key by assigning a certificate based on the public key authentication to each group member. The authentication using a public key refers to the system that two parties authenticate each other by obtaining the third party's guarantee (electronic signature) for a public key using an authentication station as the reliable third party.

Figure 23:
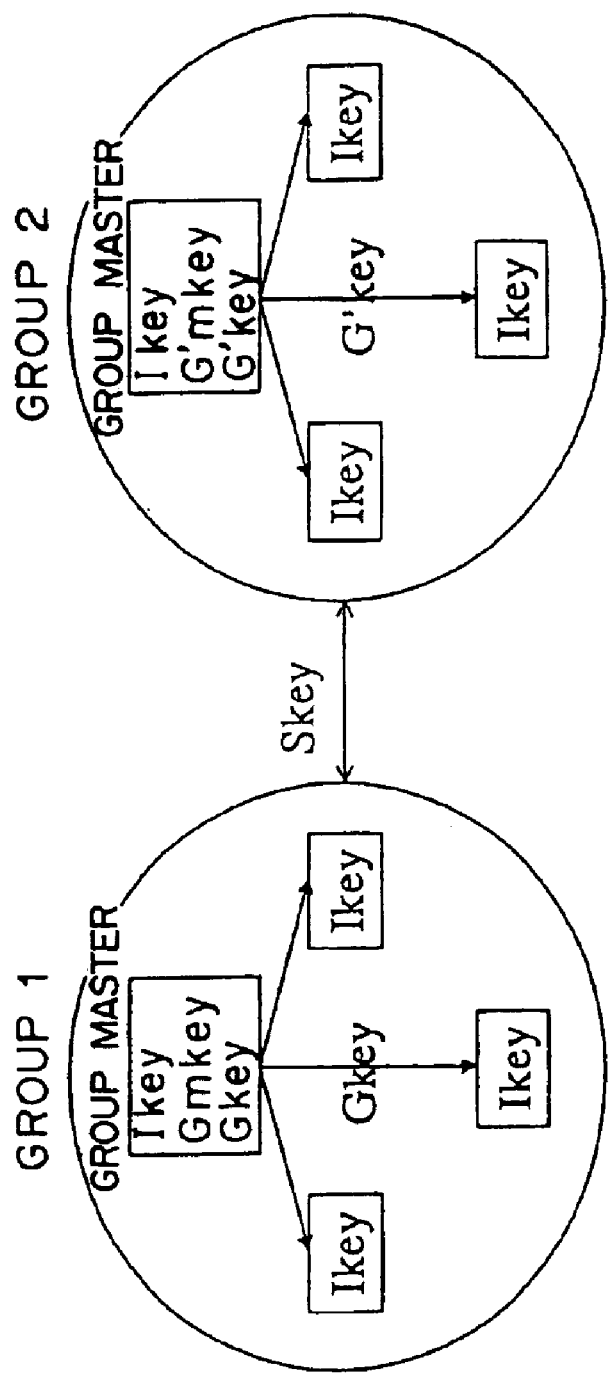
FIG. 23 shows the generation and the distribution of a group key.

FIG. 23 shows the generation and the distribution of a group key. In FIG. 23, for example, there are two groups 1 and 2, and each group has a group master and three subordinate SAs. In FIG. 23, for example, a group master first generates a group master key (Gm key) using its own individual key, an I key, and the ID of the electronic data storage apparatus to which it belongs, then generates a group key and a G key using the Gm key and the ID of the group, and distributes the group key to the subordinate SAs.

The group key is stored in the group key storage unit in each SA, and managed by a combination of an ID and a key for identifying each group. Normally, plural combinations of a group key and an ID for identifying a group are stored because an SA belongs to a plurality of groups and it is necessary for a lower order group master SA described by referring to FIG. 16 to store a higher order group key and a lower order group key. In addition to a combination of a group key and an ID, an attribute such as the IP address, the name of an electronic data storage apparatus in a group, etc. can be simultaneously managed.

In FIG. 23, the communications are established between the groups 1 and 2 using a session key (S key). The session key is a private key shared among, for example, group masters based on a public key certificate. A public key is used for communications with a plurality of different groups, managed by a plurality of, for example, group masters as with the case of a group key, and can be stored such that a reliable third party can confirm the authentication based on a public key certificate indicated by the ITU-TX509 of the International Telecommunications Union.

Figure 24:
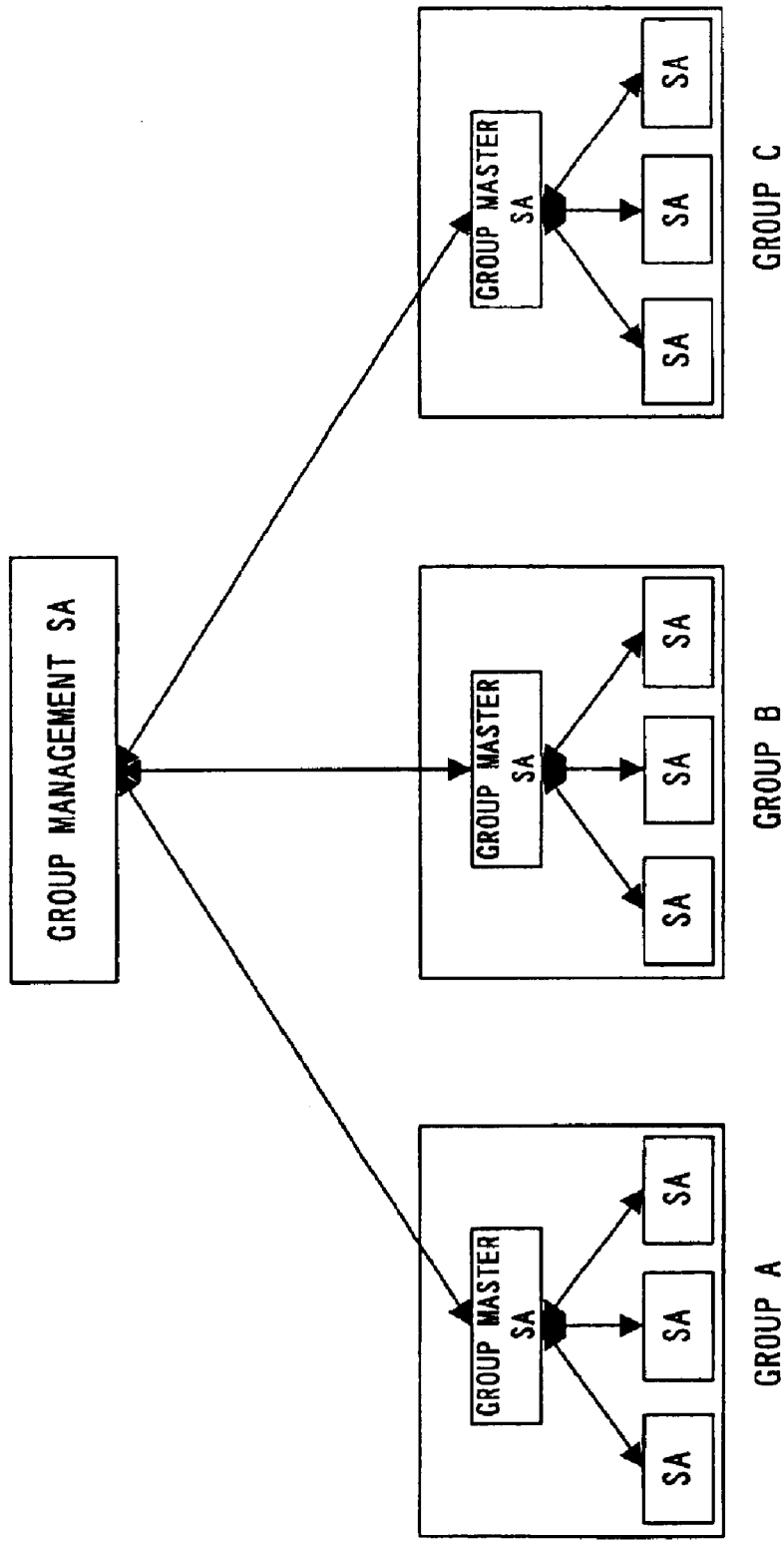
FIG. 24 shows the method of managing the entire system through group management SA when there are a plurality of groups each comprising a plurality of SAs.

FIG. 24 shows the method of managing the entire system through group management SA when there are a plurality of groups each comprising a plurality of SAs. In FIG. 24, there are three groups A, B, and C. Each group contains a main electronic data storage apparatus, that is, a group master.

A group management SA (group management and electronic data storage apparatus) manages group masters SA of respective groups. For example, as shown in FIG. 14, an individual key of a group master SA is generated and distributed to each group master SA. Thus, by providing a group management SA for managing a plurality of groups, communications can be established with any of a number of groups even through a global network such as the Internet, etc.

Figure 25:
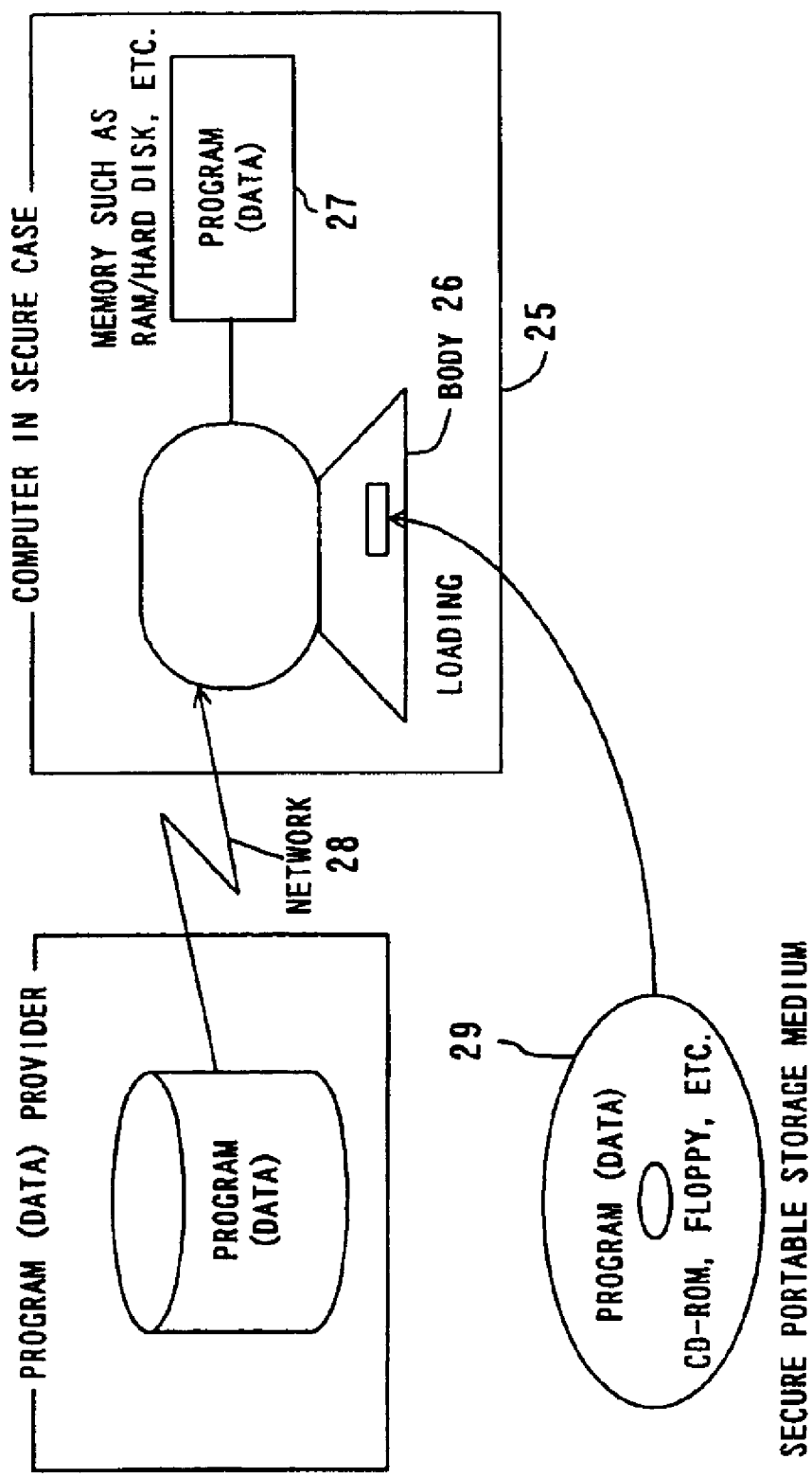
FIG. 25 shows the loading of a program onto the computer for realizing the electronic data storage apparatus according to the present invention.

Finally described by referring to FIG. 25 is the process of loading a program for realizing the electronic data storage apparatus with a key management function according to the present invention onto a computer. In FIG. 25, a computer 25 stored in a secure case comprises a body 26 and memory 27, and a program can be loaded onto the body 26 from a secure portable storage medium 29. A program can also be loaded from a program provider through a network 28.

Programs for use in performing various processes in the electronic data storage apparatus within the scope of the claims of the present invention, programs for transmitting and receiving data between electronic data storage apparatuses, and programs shown in each flowchart are stored in, for example, a secure memory 27, and executed by the body 26. The secure memory 27 can be a hard disk, etc.

Programs for use in transmitting and receiving data between electronic data storage apparatuses are stored in the secure portable storage medium 29, loaded onto the secure computer 25, thereby establishing communications. The secure portable storage medium 29 can be a secure memory card, floppy disk, CD/ROM, optical disk, magneto-optical disk, etc. Furthermore, programs for establishing data communications can realize the data communications by being loaded after transmitted to the computer 25 in a secure case from a program provider through the network 28.

The embodiments of the present invention have been described above in detail. However, the present invention is not limited to the above descriptions. It is obvious that the present invention can be represented by various other embodiments within the scope of the claims of the invention.

As described above in detail, the electronic data storage apparatus has the function of managing a key, thereby storing, transmitting, and receiving electronic data in any applicable environment with the security of important electronic documents guaranteed.

What is claimed is:

1. An electronic data storage apparatus for storing electronic documents included in a group of electronic data storage apparatuses including a main electronic data storage apparatus, said electronic data storage apparatus comprising:

a key management unit managing an individual key unique to said electronic data storage apparatus to which said management unit belongs, and a common key shared with other electronic data storage apparatuses of the group, selecting the individual key when performing an encryption process on an electronic document stored in said electronic data storage apparatus to which said management unit belongs, and selecting the common key when performing the encryption process or when verifying the electronic document transmitted to or received from another electronic data storage apparatus; and an encryption unit performing the encryption process using the key selected by said key management unit, and wherein said individual key is generated and distributed to said electronic data storage apparatus by said main electronic data storage.

2. The apparatus according to claim 1, wherein said key management unit manages a group key as the common key to be shared in said group.

3. The apparatus according to claim 1, wherein:

said encryption unit of said main electronic data storage apparatus generates an individual key of each electronic data storage apparatus in the group using an individual key of the apparatus to which said management unit belongs; and said generated individual key is distributed to each electronic data storage apparatus belonging to the group.

4. The apparatus according to claim 2, wherein said encryption unit of said main electronic data storage apparatus generates a group key to be shared in the group using an individual key of the apparatus to which said management unit belongs; and said generated group key Is distributed to each electronic data storage apparatus belonging to the group.

5. The apparatus according to claim 2, wherein;

said encryption unit of said main electronic data storage apparatus generates a group key to be shared in the group with a key preliminarily assigned as the individual key to said main electronic data storage apparatus associated with a new key externally specified; and said generated group key is distributed to each electronic data storage apparatus belonging to the group.

6. The apparatus according to claim 2, wherein:

an electronic data storage and management apparatus for managing respective main electronic data storage apparatuses in a plurality of groups exists;

said encryption unit of said electronic data storage and management apparatus generates an individual key of each of said main electronic data storage apparatuses using an individual key of the apparatus to which said management unit belongs; and said generated individual key is distributed to each of said main electronic data storage apparatuses.

7. The apparatus according to claim 2, wherein said key management unit manages, in addition to said group key as the common key, a public key for use in transmitting the electronic document to and receiving the electronic document from an electronic data storage apparatus belonging to a group different from a group of the electronic data storage apparatus to which said management unit belongs.

8. The apparatus according to claim 1, wherein said individual key is preliminarily assigned to each electronic data storage apparatus before use of the apparatus.

9. The apparatus according to claim 1, wherein:

said encryption unit generates the Individual key with a key preliminarily set before use of the apparatus to which said management unit belongs with a new externally specified key; and said key management unit manages the generated individual key.

10. The apparatus according to claim 1, wherein said key management unit manages, in addition to the individual key and the common key, a master key to be shared by all electronic data storage apparatuses.

11. The apparatus according to claim 10 wherein:

said encryption unit of said main electronic data storage apparatus generates a group key as the common key by encrypting information identifying the group using the master key; and said generated group key is distributed to each electronic data storage apparatus belonging to the group.

12. The apparatus according to claim 1, wherein:

a hierarchical structure of electronic data storage apparatuses is designed as having the group of a plurality of electronic data storage apparatuses as one hierarchical level; and said key management unit manages a group key as the common key depending on the hierarchical level of the group containing the electronic data storage apparatus to which said management unit belongs.

13. The apparatus according to claim 12, wherein;

in the hierarchical structure of the electronic data storage apparatuses, an electronic data storage and management apparatus for managing electronic data storage apparatuses in a lower order group exists in a group at one level higher than the lower order group;

said encryption unit of said electronic data storage and management apparatus generates a group key for the lower order group using the individual key of the apparatus to which said management unit belongs; and said generated group key is distributed to the electronic data storage apparatuses in the group at one level lower.

14. A method of managing electronic documents in an electronic data storage apparatus in a hierarchical structure having a group of a plural of electronic data storage apparatuses as one hierarchical level, the group including said electronic data storage apparatus and a main electronic data storage apparatus, the method comprising:

re-encrypting, by a first electronic data storage apparatus in one hierarchical level of the hierarchical structure, a document encrypted using an individual key which is unique to and stored in the apparatus, using a higher order group key corresponding to the hierarchical level, and transmitting the re-encrypted document to an electronic data storage and management apparatus for managing the electronic data storage apparatuses in a group at one hierarchical level lower;

verifying, by said electronic data storage and management apparatus for managing a lower group of electronic data storage apparatuses, the received document using the higher order group key. re-encrypting the received document using the lower order group key corresponding to one hierarchical level lower if the received documents is correct as a result of the verification, and transmitting the received document to a second electronic data storage apparatus in the group at one level lower; and verifying, by the second electronic data storage apparatus, the received documents using the lower order group key, re-encrypting the received document using an individual key unique to the second electronic data storage apparatus If the electronic document is correct as a result of the verification, and storing the re-encrypted received document, and wherein said individual key is generated and distributed by said main electronic data storage apparatus.

15. A method of managing electronic documents in an electronic data storage apparatus in a hierarchical structure having a group of a plurality of electronic data storage apparatuses as one hierarchical level, the group including said electronic data storage apparatus and a main electronic data storage apparatus, the method comprising:

re-encrypting, by a first electronic data storage apparatus in one hierarchical level of the hierarchical structure, a document encrypted using an individual key which is unique to and stored in the first electronic data storage apparatus, using a lower order group key corresponding to the hierarchical level, and transmitting the re-encrypted document to a lower order group electronic data storage and management apparatus for managing the electronic data storage apparatuses in the group;

verifying, by said electronic data storage and management apparatus for managing a lower group of electronic data storage apparatuses, the received document using the lower order group key, re-encrypting the received document using the higher order group key corresponding to one hierarchical level higher if the electronic document is correct as a result of the verification, and transmitting the document to a receiving electronic data storage apparatus in the group at one level higher;

verifying, by the receiving second electronic data storage apparatus, the received document using the higher order group key, re-encrypting the received document using an individual key unique to the second electronic data storage apparatus if the electronic document is correct as a result of the verification, and storing the re-encrypted received document, and wherein said individual key is generated and distributed by said main electronic data storage apparatus.

16. A method of processing electronic documents, comprising:

storing in a storage unit an individual key unique to an electronic data storage apparatus for storing an electronic document and a common key shared with another electronic data storage apparatus;

selecting the common key stored in the storage unit as a key to be used when communicating the electronic document;

selecting the individual key to be used when performing an encryption process on the document to be stored in said electronic data storage apparatus; and performing the communication process or encryption process using the selected key, and wherein said individual key is generated and distributed to said electronic data storage apparatus by a main electronic data storage apparatus in a group of data storage apparatuses including said data storage apparatus.

17. The method according to claim 16, wherein;

said electronic data storage apparatus stores as the common key a group key shared in one group;

re-encrypting, by a first electronic data storage apparatus, an electronic document, encrypted using the individual key and stored in the first electronic data storage apparatus, using the group key, and transmitting the document to a second electronic data storage apparatus; and verifying by the second electronic data storage apparatus, the received electronic document using the group key, re-encrypting the received electronic document using the individual key when the electronic document is correct according to tho result of the verification, and storing the re-encrypted received document.

18. The method according to claim 16, wherein;

said electronic data storage apparatus belonging to one group stores as the common key a public key of an electronic data storage apparatus belonging to another group;

re-encrypting by a first electronic data storage apparatus, the electronic document encrypted using individual key and stored in the first electronic data storage apparatus using the public key and transmitting document to a second electronic data storage apparatus; and verifying by the second electronic data storage apparatus the received electronic document using a private key which is a pair member with the public key, re-encrypting the received electronic document using the individual key when the electronic document is correct according to the result of the verification, and storing the re-encrypted received document.

19. An electronic data storage apparatus for storing electronic documents, comprising:

key management means for managing an individual key unique to an electronic data storage apparatus to which said key management means belongs, and a common key shared with other electronic data storage apparatuses, selecting the individual key when performing an encryption process on the electronic document stored in the electronic data storage apparatus to which said means belongs, and selecting the common key when performing an encryption process or when verifying the electronic document transmitted to or received from another electronic data storage apparatus; and encryption means for performing the encryption process using the key selected by said key management unit, and wherein said individual key is generated and distributed to said electronic data storage apparatus by a main electronic data storage apparatus in a group of data storage apparatuses including said data storage apparatus.

20. A computer-readable storage medium for storing a program which directs a computer to process electronic documents, comprising:

storing in a storage unit an individual key unique to an electronic data storage apparatus for storing an electronic document and a common key shared with another electronic date storage apparatus;

selecting the common key stored in the storage unit as a key to be used when communicating the electronic document;

selecting the individual key as a key to be used when performing an encryption process on the document to be stored in the electronic data storage apparatus; and performing the communication process or the encryption process using the selected key, and wherein said individual key is generated and distributed to said electronic data storage apparatus by a main electronic data storage apparatus in a group of data storage apparatuses including said data storage apparatus.

21. A method of document transmission for a local environment and a global environment, comprising:

storing a local encryption key for the local environment locally and storing a global key for the global environment;

receiving a document to be transmitted along with an environment indicator indicating the environment of the document transmission;

selecting one of the local and global encryption keys responsive to the indicator;

encrypting the document with the selected one of the keys; and transmitting the encrypted document, and wherein the local key is used for data storage in a local data storage unit only by a local data storage system that stores the local key.

22. A method as recited in claim 21, wherein the local environment comprises a local area network, the global environment comprises the internet, and the indicator is an address of the document transmission where a local area address indicates the local environment.

23. A method as recited in claim 22, wherein the method is performed by a data storage apparatus document transmission, the document transmission comprising a transmission to a data storage device having a device address within the data storage apparatus, said storing comprises storing a data storage device encryption key, and said selected comprises selecting the device encryption key when the transmission is to the storage device.

* * * * *

UNITED STATES PATENT AND TRADEMARK OFFICE
CERTIFICATE OF CORRECTION

PATENT NO. : 6,915,434 B1
DATED : July 5, 2005
INVENTOR(S) : Yasutsugu Kuroda et al.

It is certified that error appears in the above-identified patent and that said Letters Patent is hereby corrected as shown below:

Column 14,
Line 57, after "wherein" insert -- : --.
Line 62, delete "Is" and insert -- is --.
Line 64, after "wherein" delete ";" and insert -- : --.

Column 15,
Line 28, delete "Individual" and insert -- individual --.
Line 38, after "claim 10" insert -- , --.
Line 54, after "wherein" delete ";" and insert -- : --.

Column 16,
Line 3, delete "plural" and insert -- plurality --.
Line 19, delete "key." and insert -- if --.
Line 30, delete "If" and insert -- if --.

Column 17,
Line 34, delete "tho" and insert -- the --.
Line 42, after "document", insert -- , --.

Column 18,
Line 19, delete "date" and insert -- data --.

Signed and Sealed this

Eleventh Day of April, 2006

JON W. DUDAS
*Director of the United States Patent and Trademark Office*